US009062144B2

(12) United States Patent
Wang et al.

(10) Patent No.: US 9,062,144 B2
(45) Date of Patent: Jun. 23, 2015

(54) HAIRY POLYMERIC NANOPARTICLES WITH FIRST AND SECOND SHELL BLOCK POLYMER ARMS

(75) Inventors: Xiaorong Wang, Hudson, OH (US); Hideki Kitano, Tokyo (JP); James H. Pawlow, Akron, OH (US); Christopher G. Robertson, Akron, OH (US); Yaohong Chen, Akron, OH (US); Yuan-Yong Yan, Copley, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 12/754,367

(22) Filed: Apr. 5, 2010

(65) Prior Publication Data

US 2011/0213066 A1 Sep. 1, 2011

Related U.S. Application Data

(60) Provisional application No. 61/166,437, filed on Apr. 3, 2009.

(51) Int. Cl.
| | | |
|---|---|---|
| *C08L 21/00* | (2006.01) | |
| *C08L 7/00* | (2006.01) | |
| *C08L 53/02* | (2006.01) | |
| *C08F 297/04* | (2006.01) | |

(52) U.S. Cl.
CPC ............. *C08F 297/046* (2013.01); *C08L 21/00* (2013.01); *C08L 2205/03* (2013.01)

(58) Field of Classification Search
CPC .. C08F 297/046; C08L 2205/00; C08L 21/00
USPC .......................................................... 525/70
See application file for complete search history.

(56) References Cited

U.S. PATENT DOCUMENTS

| | | | |
|---|---|---|---|
| 2,531,396 A | 11/1950 | Carter et al. | |
| 3,177,186 A * | 4/1965 | Miller ........................... | 525/355 |
| 3,598,884 A | 8/1971 | Wei et al. | |
| 3,793,402 A | 2/1974 | Owens | |
| 3,840,620 A | 10/1974 | Gallagher | |
| 3,927,143 A * | 12/1975 | Makowski et al. ........... | 525/242 |
| 3,972,963 A | 8/1976 | Schwab et al. | |
| 4,075,186 A | 2/1978 | Ambrose et al. | |
| 4,233,409 A | 11/1980 | Bulkley | |
| 4,247,434 A | 1/1981 | Venderhoff et al. | |
| 4,248,986 A | 2/1981 | Lai et al. | |
| 4,326,008 A | 4/1982 | Rembaum | |
| 4,386,125 A | 5/1983 | Shiraki et al. | |
| 4,408,018 A | 10/1983 | Bartman et al. | |
| 4,417,029 A * | 11/1983 | Milkovich ..................... | 525/314 |
| 4,463,129 A | 7/1984 | Shinada et al. | |
| 4,471,093 A | 9/1984 | Furukawa et al. | |
| 4,543,403 A | 9/1985 | Isayama et al. | |
| 4,598,105 A | 7/1986 | Weber et al. | |
| 4,600,749 A | 7/1986 | Minekawa et al. | |
| 4,602,052 A | 7/1986 | Weber et al. | |
| 4,617,346 A | 10/1986 | Sonoda | |
| 4,659,782 A * | 4/1987 | Spinelli ........................ | 525/293 |
| 4,659,790 A | 4/1987 | Shimozato et al. | |
| 4,717,655 A | 1/1988 | Fluwyler | |
| 4,722,770 A | 2/1988 | Blottiere et al. | |
| 4,725,522 A | 2/1988 | Breton et al. | |
| 4,764,572 A | 8/1988 | Bean, Jr. | |
| 4,773,521 A | 9/1988 | Chen | |
| 4,774,189 A | 9/1988 | Schwartz | |
| 4,788,254 A | 11/1988 | Kawakubo et al. | |
| 4,798,691 A | 1/1989 | Kasai et al. | |
| 4,829,130 A | 5/1989 | Licchelli et al. | |
| 4,829,135 A | 5/1989 | Gunesin et al. | |
| 4,837,274 A | 6/1989 | Kawakubo et al. | |
| 4,837,401 A | 6/1989 | Hirose et al. | |
| 4,861,131 A | 8/1989 | Bois et al. | |
| 4,870,144 A | 9/1989 | Noda et al. | |
| 4,871,814 A | 10/1989 | Gunesin et al. | |
| 4,904,730 A | 2/1990 | Moore et al. | |
| 4,904,732 A | 2/1990 | Iwahara et al. | |
| 4,906,695 A | 3/1990 | Blizzard et al. | |
| 4,920,160 A | 4/1990 | Chip et al. | |
| 4,942,209 A | 7/1990 | Gunesin | |
| 4,987,202 A | 1/1991 | Zeigler | |
| 5,036,138 A | 7/1991 | Stamhuis et al. | |
| 5,066,729 A | 11/1991 | Stayer, Jr. et al. | |
| 5,073,498 A | 12/1991 | Schwartz et al. | |

(Continued)

FOREIGN PATENT DOCUMENTS

| | | |
|---|---|---|
| CA | 2127919 | 3/1995 |
| CN | 1560094 | 1/2005 |
| DE | 3434983 | 4/1986 |
| DE | 3735403 | 5/1989 |
| DE | 4241538 | 6/1994 |
| EP | 0143500 | 6/1985 |
| EP | 0255170 | 2/1988 |
| EP | 0265142 | 4/1988 |
| EP | 0322905 | 7/1989 |
| EP | 0352042 | 1/1990 |
| EP | 0472344 | 2/1992 |
| EP | 0540942 | 5/1993 |
| EP | 0590491 | 4/1994 |

(Continued)

OTHER PUBLICATIONS

Walther (Engineering Nanostructure Polymer Blends with Controlled Nanoparticle Location using Janus Particles. ACS Nano. 2008, 2(6), pp. 1167-1178).*

(Continued)

*Primary Examiner* — Brieann R Fink
(74) *Attorney, Agent, or Firm* — Meredith E. Hooker; Nathan T. Lewis

(57) ABSTRACT

Compositions and methods are included for preparing a hairy polymeric nanoparticle including first and second shell block polymer arms are at least partially phase-separated and surround a polymeric core. One type of polymeric arm can have a greater polarity than the other type(s) of polymeric arms. A rubber composition including the hairy nanoparticles is also provided.

24 Claims, 4 Drawing Sheets

(56) References Cited

U.S. PATENT DOCUMENTS

| | | |
|---|---|---|
| 5,075,377 A | 12/1991 | Kawabuchi et al. |
| 5,120,379 A | 6/1992 | Noda et al. |
| 5,130,377 A | 7/1992 | Trepka et al. |
| 5,169,914 A | 12/1992 | Kaszas et al. |
| 5,183,851 A * | 2/1993 | Visani et al. ............. 525/85 |
| 5,194,300 A | 3/1993 | Cheung |
| 5,219,945 A | 6/1993 | Dicker et al. |
| 5,227,419 A | 7/1993 | Moczygemba et al. |
| 5,237,015 A | 8/1993 | Urban |
| 5,241,008 A | 8/1993 | Hall |
| 5,247,021 A | 9/1993 | Fujisawa et al. |
| 5,256,736 A | 10/1993 | Trepka et al. |
| 5,262,502 A | 11/1993 | Fujisawa et al. |
| 5,290,873 A | 3/1994 | Noda et al. |
| 5,290,875 A | 3/1994 | Moczygemba et al. |
| 5,290,878 A | 3/1994 | Yamamoto et al. |
| 5,296,547 A | 3/1994 | Nestegard et al. |
| 5,298,559 A | 3/1994 | Fujii et al. |
| 5,329,005 A | 7/1994 | Lawson et al. |
| 5,331,035 A | 7/1994 | Hall |
| 5,336,712 A | 8/1994 | Austgen, Jr. et al. |
| 5,362,794 A | 11/1994 | Inui et al. |
| 5,395,891 A | 3/1995 | Obrecht et al. |
| 5,395,902 A | 3/1995 | Hall |
| 5,399,628 A | 3/1995 | Moczygemba et al. |
| 5,399,629 A | 3/1995 | Coolbaugh et al. |
| 5,405,903 A | 4/1995 | Van Westrenen et al. |
| 5,421,866 A | 6/1995 | Stark-Kasley et al. |
| 5,436,298 A | 7/1995 | Moczygemba et al. |
| 5,438,103 A | 8/1995 | DePorter et al. |
| 5,447,990 A | 9/1995 | Noda et al. |
| 5,462,994 A | 10/1995 | Lo et al. |
| 5,514,734 A | 5/1996 | Maxfield et al. |
| 5,514,753 A | 5/1996 | Ozawa et al. |
| 5,521,309 A | 5/1996 | Antkowiak et al. |
| 5,525,639 A | 6/1996 | Keneko et al. |
| 5,527,870 A | 6/1996 | Maeda et al. |
| 5,530,052 A | 6/1996 | Takekoshi et al. |
| 5,534,592 A * | 7/1996 | Halasa et al. ............. 525/236 |
| 5,580,925 A | 12/1996 | Iwahara et al. |
| 5,587,423 A | 12/1996 | Brandstetter et al. |
| 5,594,072 A | 1/1997 | Handlin, Jr. et al. |
| 5,614,579 A | 3/1997 | Roggeman et al. |
| 5,627,252 A | 5/1997 | De La Croi Habimana |
| 5,674,592 A | 10/1997 | Clark et al. |
| 5,686,528 A | 11/1997 | Wills et al. |
| 5,688,856 A | 11/1997 | Austgen, Jr. et al. |
| 5,700,897 A | 12/1997 | Klainer et al. |
| 5,707,439 A | 1/1998 | Takekoshi et al. |
| 5,728,791 A | 3/1998 | Tamai et al. |
| 5,733,975 A * | 3/1998 | Aoyama et al. ............. 525/84 |
| 5,739,267 A | 4/1998 | Fujisawa et al. |
| 5,742,118 A | 4/1998 | Endo et al. |
| 5,747,152 A | 5/1998 | Oka et al. |
| 5,763,551 A | 6/1998 | Wunsch et al. |
| 5,773,521 A | 6/1998 | Hoxmeier et al. |
| 5,777,037 A | 7/1998 | Yamanaka et al. |
| 5,811,501 A | 9/1998 | Chiba et al. |
| 5,834,563 A | 11/1998 | Kimura et al. |
| 5,847,054 A | 12/1998 | McKee et al. |
| 5,849,847 A | 12/1998 | Quirk |
| 5,855,972 A | 1/1999 | Kaeding |
| 5,883,173 A | 3/1999 | Elspass et al. |
| 5,891,947 A | 4/1999 | Hall et al. |
| 5,897,811 A | 4/1999 | Lesko |
| 5,905,116 A | 5/1999 | Wang et al. |
| 5,910,530 A | 6/1999 | Wang et al. |
| 5,955,537 A | 9/1999 | Steininger et al. |
| 5,986,010 A | 11/1999 | Clites et al. |
| 5,994,468 A | 11/1999 | Wang et al. |
| 6,011,116 A | 1/2000 | Aoyama et al. |
| 6,020,446 A | 2/2000 | Okamoto et al. |
| 6,025,416 A | 2/2000 | Proebster et al. |
| 6,025,445 A | 2/2000 | Chiba et al. |
| 6,060,549 A | 5/2000 | Li et al. |
| 6,060,559 A | 5/2000 | Feng et al. |
| 6,075,092 A * | 6/2000 | Nakamura et al. ............. 525/122 |
| 6,087,016 A | 7/2000 | Feeney et al. |
| 6,087,456 A | 7/2000 | Sakaguchi et al. |
| 6,106,953 A | 8/2000 | Zimmermann et al. |
| 6,117,932 A | 9/2000 | Hasegawa et al. |
| 6,121,379 A | 9/2000 | Yamanaka et al. |
| 6,127,488 A | 10/2000 | Obrecht et al. |
| 6,147,151 A | 11/2000 | Fukumoto et al. |
| 6,166,855 A | 12/2000 | Ikeyama et al. |
| 6,180,693 B1 | 1/2001 | Tang et al. |
| 6,191,217 B1 | 2/2001 | Wang et al. |
| 6,197,849 B1 | 3/2001 | Zilg et al. |
| 6,204,354 B1 | 3/2001 | Wang et al. |
| 6,207,263 B1 | 3/2001 | Takematsu et al. |
| 6,225,394 B1 | 5/2001 | Lan et al. |
| 6,252,014 B1 | 6/2001 | Knauss |
| 6,255,372 B1 | 7/2001 | Lin et al. |
| 6,268,451 B1 | 7/2001 | Faust et al. |
| 6,277,304 B1 | 8/2001 | Wei et al. |
| 6,348,546 B2 | 2/2002 | Hiiro et al. |
| 6,359,075 B1 | 3/2002 | Wollum et al. |
| 6,379,791 B1 | 4/2002 | Cernohous et al. |
| 6,383,500 B1 | 5/2002 | Wooley et al. |
| 6,395,829 B1 | 5/2002 | Miyamoto et al. |
| 6,420,486 B1 | 7/2002 | DePorter et al. |
| 6,437,050 B1 | 8/2002 | Krom et al. |
| 6,441,090 B1 | 8/2002 | Demirors et al. |
| 6,448,353 B1 | 9/2002 | Nelson et al. |
| 6,489,378 B1 | 12/2002 | Sosa et al. |
| 6,506,567 B2 | 1/2003 | Makino et al. |
| 6,524,595 B1 | 2/2003 | Perrier et al. |
| 6,573,313 B2 | 6/2003 | Li et al. |
| 6,573,330 B1 | 6/2003 | Fujikake et al. |
| 6,598,645 B1 | 7/2003 | Larson |
| 6,649,702 B1 | 11/2003 | Rapoport et al. |
| 6,663,960 B1 | 12/2003 | Murakami et al. |
| 6,689,469 B2 | 2/2004 | Wang et al. |
| 6,693,746 B1 | 2/2004 | Nakamura et al. |
| 6,706,813 B2 | 3/2004 | Chiba et al. |
| 6,706,823 B2 | 3/2004 | Wang et al. |
| 6,727,307 B2 * | 4/2004 | Kondo et al. ............. 524/430 |
| 6,727,311 B2 | 4/2004 | Ajbani et al. |
| 6,737,486 B2 | 5/2004 | Wang |
| 6,750,297 B2 | 6/2004 | Yeu et al. |
| 6,759,464 B2 | 7/2004 | Ajbani et al. |
| 6,774,185 B2 | 8/2004 | Lin et al. |
| 6,777,500 B2 | 8/2004 | Lean et al. |
| 6,780,937 B2 | 8/2004 | Castner |
| 6,835,781 B2 | 12/2004 | Kondou et al. |
| 6,858,665 B2 | 2/2005 | Larson |
| 6,861,462 B2 | 3/2005 | Parker et al. |
| 6,872,785 B2 * | 3/2005 | Wang et al. ............. 525/313 |
| 6,875,818 B2 | 4/2005 | Wang |
| 6,908,958 B2 | 6/2005 | Maruyama et al. |
| 6,956,084 B2 | 10/2005 | Wang et al. |
| 7,056,840 B2 | 6/2006 | Miller et al. |
| 7,067,199 B2 | 6/2006 | Hattori et al. |
| 7,071,246 B2 | 7/2006 | Xie et al. |
| 7,112,369 B2 | 9/2006 | Wang et al. |
| 7,179,864 B2 | 2/2007 | Wang |
| 7,193,004 B2 | 3/2007 | Weydert et al. |
| 7,205,370 B2 | 4/2007 | Wang et al. |
| 7,217,775 B2 | 5/2007 | Castner |
| 7,238,751 B2 | 7/2007 | Wang et al. |
| 7,244,783 B2 | 7/2007 | Lean et al. |
| 7,291,394 B2 | 11/2007 | Winkler et al. |
| 7,347,237 B2 | 3/2008 | Xie et al. |
| 7,408,005 B2 | 8/2008 | Zheng et al. |
| 7,538,159 B2 | 5/2009 | Wang et al. |
| 7,544,740 B2 | 6/2009 | Wang et al. |
| 7,553,909 B2 | 6/2009 | Wang et al. |
| 7,560,510 B2 | 7/2009 | Wang et al. |
| 7,597,959 B2 | 10/2009 | Wang et al. |
| 7,649,049 B2 | 1/2010 | Kleckner et al. |
| 7,659,342 B2 | 2/2010 | Wang et al. |
| 7,695,813 B2 | 4/2010 | Schultes et al. |
| 7,718,737 B2 | 5/2010 | Wang et al. |
| 7,718,738 B2 | 5/2010 | Wang et al. |

(56) References Cited

U.S. PATENT DOCUMENTS

| | | | |
|---|---|---|---|
| 7,786,236 B2 | 8/2010 | Wang et al. | |
| 7,795,344 B2 * | 9/2010 | Wang et al. | 524/526 |
| 7,820,771 B2 | 10/2010 | Lapra et al. | |
| 7,829,624 B2 | 11/2010 | Warren | |
| 7,884,160 B2 | 2/2011 | Wang et al. | |
| 7,897,690 B2 | 3/2011 | Wang et al. | |
| 7,998,554 B2 | 8/2011 | Wang et al. | |
| 8,063,142 B2 | 11/2011 | Wang et al. | |
| 2001/0053813 A1 | 12/2001 | Konno et al. | |
| 2002/0007011 A1 | 1/2002 | Konno et al. | |
| 2002/0045714 A1 | 4/2002 | Tomalia et al. | |
| 2002/0095008 A1 | 7/2002 | Heinrich et al. | |
| 2002/0144401 A1 | 10/2002 | Nogueroles Vines et al. | |
| 2003/0004250 A1 | 1/2003 | Ajbani et al. | |
| 2003/0032710 A1 | 2/2003 | Larson | |
| 2003/0124353 A1 | 7/2003 | Wang et al. | |
| 2003/0130401 A1 | 7/2003 | Lin et al. | |
| 2003/0149185 A1 | 8/2003 | Wang et al. | |
| 2003/0198810 A1 | 10/2003 | Wang et al. | |
| 2003/0225190 A1 | 12/2003 | Borbely et al. | |
| 2004/0033345 A1 | 2/2004 | Dubertret et al. | |
| 2004/0059057 A1 | 3/2004 | Swisher et al. | |
| 2004/0091546 A1 | 5/2004 | Johnson et al. | |
| 2004/0127603 A1 | 7/2004 | Lean et al. | |
| 2004/0143064 A1 | 7/2004 | Wang | |
| 2004/0198917 A1 | 10/2004 | Castner | |
| 2004/0202881 A1 | 10/2004 | Everaerts et al. | |
| 2005/0006014 A1 * | 1/2005 | Halasa et al. | 152/209.1 |
| 2005/0101743 A1 | 5/2005 | Stacy et al. | |
| 2005/0122819 A1 | 6/2005 | Park et al. | |
| 2005/0182158 A1 | 8/2005 | Ziser et al. | |
| 2005/0192408 A1 | 9/2005 | Wang et al. | |
| 2005/0197462 A1 | 9/2005 | Wang et al. | |
| 2005/0203248 A1 | 9/2005 | Zheng et al. | |
| 2005/0215693 A1 | 9/2005 | Wang et al. | |
| 2005/0220750 A1 | 10/2005 | Robert et al. | |
| 2005/0220890 A1 | 10/2005 | Charmot et al. | |
| 2005/0228072 A1 | 10/2005 | Winkler et al. | |
| 2005/0228074 A1 | 10/2005 | Warren et al. | |
| 2005/0282956 A1 | 12/2005 | Bohm et al. | |
| 2005/0288393 A1 | 12/2005 | Lean et al. | |
| 2006/0084722 A1 | 4/2006 | Lin et al. | |
| 2006/0116473 A1 * | 6/2006 | Castner et al. | 525/71 |
| 2006/0147714 A1 | 7/2006 | Schultes et al. | |
| 2006/0173115 A1 | 8/2006 | Wang et al. | |
| 2006/0173130 A1 | 8/2006 | Wang et al. | |
| 2006/0235128 A1 | 10/2006 | Wang et al. | |
| 2006/0280798 A1 | 12/2006 | Ensoli | |
| 2007/0027264 A1 | 2/2007 | Wang et al. | |
| 2007/0081830 A1 | 4/2007 | Bender et al. | |
| 2007/0135579 A1 | 6/2007 | Obrecht et al. | |
| 2007/0142550 A1 | 6/2007 | Wang et al. | |
| 2007/0142559 A1 | 6/2007 | Wang et al. | |
| 2007/0149649 A1 | 6/2007 | Wang et al. | |
| 2007/0149652 A1 | 6/2007 | Yoon et al. | |
| 2007/0161754 A1 | 7/2007 | Bohm et al. | |
| 2007/0181302 A1 | 8/2007 | Bicerano | |
| 2007/0185273 A1 | 8/2007 | Hall et al. | |
| 2007/0196653 A1 * | 8/2007 | Hall et al. | 428/402 |
| 2008/0001116 A1 * | 1/2008 | Fredrickson et al. | 252/62.3 Q |
| 2008/0145660 A1 | 6/2008 | Wang et al. | |
| 2008/0149238 A1 | 6/2008 | Kleckner et al. | |
| 2008/0160305 A1 | 7/2008 | Wang et al. | |
| 2008/0171272 A1 * | 7/2008 | Nakashima et al. | 430/7 |
| 2008/0188579 A1 | 8/2008 | Wang et al. | |
| 2008/0242813 A1 | 10/2008 | Zheng et al. | |
| 2008/0286374 A1 | 11/2008 | Wang et al. | |
| 2008/0305336 A1 | 12/2008 | Wang et al. | |
| 2009/0005491 A1 | 1/2009 | Warren et al. | |
| 2009/0048390 A1 | 2/2009 | Wang et al. | |
| 2009/0054554 A1 | 2/2009 | Wang et al. | |
| 2009/0270558 A1 | 10/2009 | Gandon-Pain et al. | |
| 2009/0306246 A1 * | 12/2009 | Gervat et al. | 523/201 |
| 2010/0004398 A1 | 1/2010 | Wang et al. | |
| 2010/0016472 A1 | 1/2010 | Wang et al. | |
| 2010/0016512 A1 | 1/2010 | Wang et al. | |
| 2010/0324167 A1 | 12/2010 | Wang et al. | |
| 2011/0021702 A1 | 1/2011 | Gandon-Pain et al. | |
| 2011/0024011 A1 | 2/2011 | Castner et al. | |
| 2011/0213066 A1 | 9/2011 | Wang et al. | |
| 2011/0236686 A1 | 9/2011 | Kitano et al. | |
| 2012/0132346 A1 | 5/2012 | Chen et al. | |

FOREIGN PATENT DOCUMENTS

| | | | |
|---|---|---|---|
| EP | 0742268 | | 11/1996 |
| EP | 1031605 | | 8/2000 |
| EP | 1099728 | | 5/2001 |
| EP | 1134251 | | 9/2001 |
| EP | 1273616 | | 1/2003 |
| EP | 1321489 | | 6/2003 |
| EP | 1783168 | | 5/2007 |
| JP | 70002106 | B * | 1/1970 |
| JP | 1279943 | | 1/1989 |
| JP | 2191619 | | 7/1990 |
| JP | 2196893 | | 8/1990 |
| JP | 01532605 | | 5/1993 |
| JP | 06-093057 | A | 4/1994 |
| JP | 06248017 | | 9/1994 |
| JP | 7011043 | | 1/1995 |
| JP | 8199062 | | 8/1996 |
| JP | 2000-514791 | | 11/2000 |
| JP | 2003-095640 | | 4/2003 |
| JP | 2005-537341 | A | 12/2005 |
| JP | 2006-072283 | | 3/2006 |
| JP | 2006-106596 | | 4/2006 |
| JP | 2007-304409 | | 11/2007 |
| JP | 2008-069346 | | 3/2008 |
| KR | 2008-0057319 | | 6/2008 |
| RU | 2184125 | | 6/2002 |
| SU | 465010 | | 11/1975 |
| WO | 9104992 | | 7/1991 |
| WO | 9704029 | | 2/1997 |
| WO | 9853000 | | 11/1998 |
| WO | 0187999 | | 11/2000 |
| WO | 0075226 | | 12/2000 |
| WO | 0202472 | | 1/2002 |
| WO | 0241987 | | 5/2002 |
| WO | 0244290 | | 6/2002 |
| WO | 02031002 | | 7/2002 |
| WO | 02081233 | | 10/2002 |
| WO | 02100936 | | 12/2002 |
| WO | 03032061 | | 4/2003 |
| WO | 03085040 | | 10/2003 |
| WO | 03106557 | | 12/2003 |
| WO | 2004/058874 | | 7/2004 |
| WO | 2006/069793 | | 7/2006 |
| WO | 2008/014464 | | 1/2008 |
| WO | 2008/079276 | | 7/2008 |
| WO | 2008/079807 | | 7/2008 |
| WO | 2009/006434 | | 1/2009 |

OTHER PUBLICATIONS

Derwent Abstract of JP 70-002106 (Jan. 1970).*
Cheng (Efficient Synthesis of Unimolecular Polymeric Janus Nanoparticles and Their Unique Self-Assembly Behavior in a Common Solvent. Macromolecules 2008, 41, pp. 8159-8166).*
Robertson (Effect of structural arrest on Poisson's ratio in nanoreinforced elastomers. Physical Review E, 2007, 75, pp. 051403-1 to 051403-7).*
Tsitsilianis (Phase Behavior of Heteroarm Star Copolymers by Differential Scanning Calorimetry, Macromolecules 1993, 25, 2977-2980).*
Wang (Synthesis, Characterization, and Application of Novel Polymeric Nanoparticles, Macromolecules 2007, 40, 499-508).*
Papadopoulos (Origin of Glass Transition of Poly(2-vinylpyridine). A Temperature- and Pressure-Dependent Dielectric Spectroscopy Study. Macromolecules. 2004, 37, pp. 8116-8122).*
Walther (Engineering Nanostructured Polymer Blends with Controlled Nanoparticle Location using Janus Particles. ACS Nano., 2(6), 2008, pp. 1167-1178).*

(56) References Cited

OTHER PUBLICATIONS

Akashi, Mitsuru et al., "Synthesis and Polymerization of a Styryl Terminated Oligovinylpyrrolidone Macromonomer", Die Angewandte Makromolekulare Chemie, 132, pp. 81-89 (1985).

Alexandridis, Paschalis et al., "Amphiphilic Block Copolymers: Self-Assembly and Applications", Elsevier Science B.V., pp. 1-435 (2000).

Allgaier, Jurgen et al., "Synthesis and Micellar Properties of PS-PI Block Copolymers of Different Architecture", ACS Polym. Prepr. (Div Polym. Chem.), vol. 37, No. 2, pp. 670-671 (1996).

Antonietti, Markus et al., "Determination of the Micelle Architecture of Polystyrene/Poly(4-vinylpyridine) Block Copolymers in Dilute Solution", Macromolecules, 27, pp. 3276-3281 (1994).

Antonietti, Markus et al., "Novel Amphiphilic Block Copolymers by Polymer Reactions and Their Use for Solubilization of Metal Salts and Metal Colloids", Macromolecules, 29, pp. 3800-3806 (1996).

Bahadur, Pratap, "Block copolymers—Their microdomain formation (in solid state) and surfactant behaviour (in solution)", Current Science, vol. 80, No. 8, pp. 1002-1007 (Apr. 25, 2001).

Batzilla, Thomas et al., "Formation of intra- and intermolecular crosslinks in the radical crosslinking of poly(4-vinylstyrene)", Makromol. Chem., Rapid Commun. 8, pp. 261-268 (1987).

Bauer, B.J. et al., "Synthesis and Dilute-Solution Behavior of Model Star-Branched Polymers", Rubber Chemistry and Technology, vol. 51, pp. 406-436 (1978).

Berger, G. et al., "Mutual Termination of Anionic and Cationic 'Living' Polymers", Polymer Letters, vol. 4, pp. 183-186 (1966).

Bohm, Georg et al., "Emerging materials: technology for new tires and other rubber products", Tire Technology International, 4 pp. (2006).

Borukhov, Itamar et al., "Enthalpic Stabilization of Brush-Coated Particles in a Polymer Melt", Macromolecules, vol. 35, pp. 5171-5182 (2002).

Bradley, John S., "The Chemistry of Transition Metal Colloids", Clusters and Colloids: From Theory to Applications, Chapter 6, Weinheim, VCH, pp. 459-544 (1994).

Bradley, Melanie et al., "Poly(vinylpyridine) Core/Poly(N-isoproplacrylamide) Shell Microgel Particles: Their Characterization and the Uptake and Release of an Anionic Surfactant", Langmuir, vol. 24, pp. 2421-2425 (Mar. 14, 2008).

Braun, Hartmut et al., "Enthalpic interaction of diblock copolymers with immiscible polymer blend components", Polymer Bulletin, vol. 32, pp. 241-248 (1994).

Bronstein, Lyudmila M. et al., "Synthesis of Pd-, Pt-, and Rh-containing polymers derived from polystyrene-polybutadiene block copolymers; micellization of diblock copolymers due to complexation", Macromol. Chem. Phys., 199, pp. 1357-1363 (1998).

Brown, H.R. et al., "Communications to the Editor: Enthalpy-Driven Swelling of a Polymer Brush", Macromolecules, vol. 23, pp. 3383-3385 (1990).

Cahn, John W., "Phase Separation by Spinodal Decomposition in Isotropic Systems", The Journal of Chemical Physics, vol. 42, No. 1, pp. 93-99 (Jan. 1, 1965).

Calderara, Frederic et al., "Synthesis of chromophore-labelled polystyrene/poly(ethylene oxide) diblock copolymers", Makromol. Chem., 194, pp. 1411-1420 (1993).

Canham et al., "Formation of Worm-like Micelles from a Polystyrene-Polybutadiene-Polystyrene Block Copolymer in Ethyl Acetate", J.C.S. Faraday I, 76, pp. 1857-1867 (1980).

Chen, Ming-Qing et al., "Graft Copolymers Having Hydrophobic Backbone and Hydrophilic Branches. XXIII. Particle Size Control of Poly(ethylene glycol)-Coated Polystyrene Nanoparticles Prepared by Macromonomer Method", Journal of Polymer Science: Part A: Polymer Chemistry, vol. 37, pp. 2155-2166 (1999).

Chen, Wei et al., "Ultrahydrophobic and Ultrayophobic Surfaces: Some Comments and Examples", The ACS Journal of Surfaces and Colloids, vol. 15, No. 10, pp. 3395-3399 (May 11, 1999).

Chen, Ming-Qing et al., "Nanosphere Formation in Copolymerization of Methyl Methacrylate with Poly(ethylene glycol) Macromonomers", Journal of Polymer Science: Part A: Polymer Chemistry, vol. 38, pp. 1811-1817 (2000).

Coleman, Lester E. et al., "Reaction of Primary Aliphatic Amines with Maleic Anhydride", J. Org,. Chem., 24, 185, pp. 135-136 (1959).

Cosgrove, T. et al., "Adsorbed Block Copolymer of Poly(2-vinylpyridine) and Polystyrene Studied by Neutron Reflectivity and Surface Force Techniques", Macromolecules, 26, pp. 4363-4367 (1993).

Coulson, S.R. et al., "Super-Repellent Composite Fluoropolymer Surfaces", The Journal of Physical Chemistry B, vol. 104, No. 37, pp. 8836-8840 (Sep. 21, 2000).

Cui, Honggang et al., "Block Copolymer Assembly via Kinetic Control", Science, vol. 317, pp. 647-650 (Aug. 3, 2007).

Dieterich, W. et al., "Non-Debye Relaxations in Disordered Ionic Solids", Chem. Chys., 284, pp. 439-467 (2002).

Edmonds, William F. et al., "Disk Micelles from Nonionic Coil- Coil Diblock Copolymers", Macromolecules, vol. 39, pp. 4526-4530 (May 28, 2006).

Ege, Seyhan, Organic Chemistry Structure and Reactivity, 3rd Edition, p. 959 (1994).

Eisenberg, Adi, "Thermodynamics, Kinetics, and Mechanisms of the Formation of Multiple Block Copolymer Morphologies", Polymer Preprints, vol. 41, No. 2, pp. 1515-1516 (2000).

Erbil, H. Yildirim et al., "Transformation of a Simple Plastic into a Superhydrophobic Surface", Science, vol. 299, pp. 1377-1380 (Feb. 28, 2003).

Erhardt, Rainer et al., "Janus Micelles", Macromolecules, vol. 34, No. 4, pp. 1069-1075 (2001).

Eschwey, Helmut et al., "Preparation and Some Properties of Star-Shaped Polymers with more than Hundred Side Chains", Die Makromolekulare Chemie 173, pp. 235-239 (1973).

Eschwey, Helmut et al., "Star polymers from styrene and divinylbenzene", Polymer, vol. 16, pp. 180-184 (Mar. 1975).

Fendler, Janos H., "Nanoparticles and Nanostructured Films: Preparation, Characterization and Applications", Wiley-VCH, pp. 1-468 (1998).

Ferreira, Paula G. et al., "Scaling Law for Entropic Effects at Interfaces between Grafted Layers and Polymer Melts", Macromolecules, vol. 31, pp. 3994-4003 (1998).

Garcia, Carlos B. et al., "Self-Assembly Approach toward Magnetic Silica-Type Nanoparticles of Different Shapes from Reverse Block Copolymer Mesophases", J. Am. Chem. Soc., vol. 125, pp. 13310-13311 (2003).

Gay, C., "Wetting of a Polymer Brush by a Chemically Identical Polymer Melt", Macromolecules, vol. 30, pp. 5939-5943 (1997).

Gilman, J.W. et al., "Recent Advances in Flame Retardant Polymer Nanocomposites", pp. 273-283.

Giannelis, E.P. "Polymer Layered Silicate Nanocomposites", Advanced Materials, vol. 8, No. 1, pp. 29-35 (Jan. 1, 1996).

Greenwood, N.N. et al., "Chemistry of the Elements", Pergaroen Press, New York, pp. 1126-1127 (1984).

Guo, Andrew et al., "Star Polymers and Nanospheres from Cross-Linkable Diblock Copolymers", Macromolecules, vol. 29, pp. 2487-2493 (Jan. 17, 1996).

Halperin, A., "Polymeric Micelles: A Star Model", Macromolecules, vol. 20, pp. 2943-2946 (1987).

Hamley, Ian W., "The Physics of Block Copolymers", Oxford Science Publication: Oxford, Chapters 3 and 4, pp. 131-265, (1998).

Hardacre, C. et al., "Structure of molten 1,3-dimethylimidazolium chloride using neutron diffraction", J. Chem. Physics, 118(1), pp. 273-278 (2003).

Hasegawa, Ryuichi et al., "Optimum Graft Density for Dispersing Particles in Polymer Melts", Macromolecules, vol. 29, pp. 6656-6662 (1996).

Haeussler, L. et al., "Simultaneous TA and MS Analysis of Alternating Styrene-Malei Anhydride and Styrene-Maleimide Copolymers", Thermochim. Acta, 277, 14 (1996).

Hay, J.N. et al., "A Review of Nanocomposites", 15 pp. (2000).

Hoffman, B. et al., "Rheology of Nanocomposites Based on Layered Silicates and Polyamide-12", Colloid Polm. Sci.., 278, pp. 629-636 (2000).

(56) References Cited

OTHER PUBLICATIONS

Ishizu, Koji et al., "Synthesis of Star Polymer with Nucleus of Microgel", Polymer Journal, vol. 12, No. 6, pp. 399-404 (1980).

Ishizu, Koji et al., "Core-Shell Type Polymer Microspheres Prepared from Block Copolymers", Journal of Polymer Science: Part C: Polymer Letters, vol. 26, pp. 281-286 (1988).

Ishizu, Koji et al., "Core-Shell Type Polymer Microspheres Prepared by Domain Fixing of Block Copolymer Films", Journal of Polymer Science: Part A: Polymer Chemistry, vol. 27, pp. 3721-3731 (1989).

Ishizu, Koji et al., "Preparation of core-shell type polymer microspheres from anionic block copolymers", Polymer, vol. 34, No. 18, pp. 3929-3933 (1993).

Ishizu, Koji, "Synthesis and Structural Ordering of Core-Shell Polymer Microspheres", Prog. Polym. Sci., vol. 23, pp. 1383-1408 (1998).

Ishizu, Koji, "Star Polymers by Immobilizing Functional Block Copolymers", Star and Hyperbranched Polymers, ISBN 0-8247, pp. 1986-1987 (1999).

Ishizu, Koji, "Structural Ordering of Core Crosslinked Nanoparticles and Architecture of Polymeric Superstructures", ACS Polym. Prepr. (Div Polym Chem) vol. 40, No. 1, pp. 456-457 (1999).

Jensen, M. et al., "EXAFS Investigations of the Mechanism of Facilitated Ion Transfer into a Room-Temperature Ionic Liquid", Jacs, 124, pp. 10664-10665 (2002).

Kim, Woo-Sik et al., "Synthesis and Photocrosslinking of Maleimide-Type Polymers", Macromol. Rapid Commun., 17, 835, pp. 835-841 (1996).

Kralik, M. et al., "Catalysis by metal nanoparticles supported on functional organic polymers", Journal of Molecular Catalysis A: Chemical, vol. 177, pp. 113-138 (2001).

Kraus, Gerard, "Mechanical Losses in Carbon-Black-Filled Rubbers", Journal of Applied Polymer Science: Applied Polymer Symposium, vol. 39, pp. 75-92 (1984).

Krishnamoorti, R. et al., "Rheology of End-Tethered Polymer Layered Silicate Nanocomposites", Macromol., 30, pp. 4097-4102 (1997).

Lagaly, Gehard, "Kink-Block and Gauche-Block Structures of Bimolecular Films", Chem. Int. Ed. Engl., vol. 15, No. 10, pp. 575-586 (1976).

Lawson, David F. et al., "Preparation and Characterization of Heterophase Blends of Polycaprolactam and Hydrogenated Polydienes", Central Research Journal of Applied Polymer Science, vol. 39, pp. 2331-2351 (1990).

Lee, Wen-Fu et al., "Polysulfobetaines and Corresponding Cationic Polymers. IV. Synthesis and Aqueous Solution Properties of Cationic Poly (MIQSDMAPM)", J. Appl. Pol. Sci., vol. 59, pp. 599-608 (1996).

Ligoure, Christian, "Adhesion between a Polymer Brush and an Elastomer: A Self-Consistent Mean Field Model", Macromolecules, vol. 29, pp. 5459-5468 (1996).

Liu, Guojun et al., "Diblock Copolymer Nanofibers", Macromolecules, 29, pp. 5508-5510 (1996).

Liu, T. et al., "Formation of Amphiphilic Block Copolymer Micelles in Nonaqueous Solution", Amphiphilic Block Copolymers: Self-Assembly and Applications, Elsevier Science B.V., pp. 115-149 (2000).

Ma, H. et al., "Reverse Atom Transfer Radical Polymerization of Methyl Methacrylate in Room-Temperature Inoic Liqquids", J. Polym. Sci., A. Polym. Chem., 41, pp. 143-151 (2003).

Ma, Qinggao et al., "Entirely Hydrophilic Shell Cross-Linked Knedel-Like (SCK) Nanoparticles", Polymer Preprints, vol. 41, No. 2, pp. 1571-1572 (2000).

Mandema et al., "Association of Block Copolymers in Selective Solvents, 1 Measurements on Hydrogenated Poly(styrene-isoprene) in Decane and in trans-Decalin", Makromol. Chem. 180, pp. 1521-1538 (1979).

Matsen, M.W., "Phase Behavior of Block Copolymer/Homopolymer Blends", Macromolecules, vol. 28, pp. 5765-5773 (1995).

Matsumoto, A. et al., "Synthesis, Thermal Properties and Gas Permeability of Poly (N-n-alkylmaleimide)s", Polymer Journal, vol. 23, No. 3, pp. 201-209 (1991).

Mayer, A.B.R. et al., "Transition metal nanoparticles protected by amphiphilic block copolymers as tailored catalyst systems", Colloid Polym. Sci., 275, pp. 333-340 (1997).

Mendizabal, E. et al., "Functionalized Core-Shell Polymers Prepared by Microemulsion Polymerization", ANTEC 1997 Plastics: Plastics Saving Planet Earth, vol. 2: Materials Conference Proceedings, pp. 1733-1737.

Mi, Yongli et al., "Glass transition of nano-sized single chain globules", Polymer 43, Elsevier Science Ltd., pp. 6701-6705 (2002).

Milner, S.T. et al., "Theory of the Grafted Polymer Brush", Macromolecules, vol. 21, pp. 2610-2619 (1988).

Milner, S.T. et al., "End-Confined Polymers: Corrections to the Newtonian Limit", Macromolecules, vol. 22, pp. 489-490 (1989).

Moller, Martin et al., "Mineralization of Gold in Block Copolymer Micelles", Macromol. Symp., 117, pp. 207-218 (1997).

Mossmer, Stefan et al., "Solution Behavior of Poly(styrene)-block-poly(2-vinylpyridine) Micelles Containing Gold Nanoparticles", Macromolecules, 33, pp. 4791-4798 (2000).

Nace, Vaughn M., "Nonionic Surfactants: Polyoxyalkylene Block Copolymers", Surfactant Science Series, vol. 60, pp. 1-266 (1996).

Newkome G.R, "Dendrimers and Dendrons, Concept, Synthesis, Application", pp. 45, 191-310 (2001).

Noolandi, Jaan et al., "Theory of Block Copolymer Micelles in Solution", Macromolecules, vol. 16, pp. 1443-1448 (1983).

O'Reilly, Rachel K. et al., "Functionalization of Micelles and Shell Cross-linked Nanoparticles Using Click Chemistry", Chem. Mater., vol. 17, No. 24, pp. 5976-5988 (Nov. 24, 2005).

O'Reilly, Rachel K. et al., "Cross-linked block copolymer micelles: functional nanostructures of great potential and versatility", Chem. Soc. Rev., vol. 35, pp. 1068-1083 (Oct. 2, 2006).

Okay, Oguz et al., "Steric stabilization of reactive microgels from 1,4-divinylbenzene", Makromol. Chem., Rapid Commun., vol. 11, pp. 583-587 (1990).

Okay, Oguz et al., "Anionic Dispersion Polymerization of 1,4-Divinylbenzene", Macromolecules, 23, pp. 2623-2628 (1990).

Oranli, Levent et al., "Hydrodynamic studies on micellar solutions of styrene-butadiene block copolymers in selective solvents", Can. J. Chem., vol. 63, pp. 2691-2696 (1985).

Piirma, Irja, "Polymeric Surfactants", Surfactant Science Series, vol. 42, pp. 1-289 (1992).

Pispas, S. et al., "Effect of Architecture on the Micellization Properties of Block Copolymers: $A_2B$ Miktoarm Stars vs AB Diblocks", Macromolecules, vol. 33, pp. 1741-1746 (Feb. 17, 2000).

Powers, P.O., "Solubility of Polystyrene Fractions in Hydrocarbons", Industrial and Engineering Chemistry, vol. 42, No. 12, pp. 2558-2562 (Dec. 1950).

Price, Colin, "Colloidal Properties of Block Copolymers", Applied Science Publishers Ltd., Chapter 2, pp. 39-80 (1982).

Quirk, Roderic P. et al., "Controlled Anionic Synthesis of Polyisoprene-Poly(2-vinylpyridine) Diblock Copolymers in Hydrocarbon Solution", Macromolecules, 34, pp. 1192-1197 (2001).

Rager, Timo et al., "Micelle formation of poly(acrylic acid)- block-poly(methyl methacrylate) block copolymers in mixtures of water with organic solvents", Macromol. Chem. Phys., 200, No. 7, pp. 1672-1680 (1999).

Rein, David H. et al., "Kinetics of arm-first star polymers formation in a non-polar solvent", Macromol. Chem. Phys., vol. 199, pp. 569-574 (1998).

Rempp, Paul et al., "Grafting and Branching of Polymers", Pure Appl. Chem., vol. 30, pp. 229-238 (1972).

Ren, J., "Linear Viscoelasticity of Disordered Polystyrene-Polyisoprene . . . Layered-Silicate Nanocomposites", Macromol., pp. 3739-3746 (2000).

Riess, Gerard et al., "Block Copolymers", Encyclopedia of Polymer Science and Engineering, vol. 2, pp. 324-434 (1985).

Riess, Gerard, "Micellization of block copolymers", Prog. Polym. Sci., vol. 28, pp. 1107-1170 (Jan. 16, 2003).

Saito, Reiko et al., "Core-Shell Type Polymer Microspheres Prepared From Poly(Styrene-b-Methacrylic Acid)—1. Synthesis of Microgel", Eur. Polym. J., vol. 27, No. 10, pp. 1153-1159 (1991).

(56) References Cited

OTHER PUBLICATIONS

Saito, Reiko et al., "Synthesis of microspheres with 'hairy-ball' structures from poly (styrene-b-2-vinyl pyridine) diblock copolymers", Polymer, vol. 33, No. 5, pp. 1073-1077 (1992).
Saito, Reiko et al., "Arm-number effect of core-shell type polymer microsphere: 1. Control of arm-number of microsphere", Polymer, vol. 35, No. 4, pp. 866-871 (1994).
Saito, Reiko et al., "Synthesis of Microspheres with Microphase-Separated Shells", Journal of Polymer Science: Part A: Polymer Chemistry, vol. 38, pp. 2091-2097 (2000).
Sakurai, Ryo et al., "68.2: Color and Flexible Electronic Paper Display using QR-LPD Technology", SID 06 Digest, pp. 1922-1925 (2006).
Semenov, A.N., "Theory of Diblock-Copolymer Segregation to the Interface and Free Surface of a Homopolymer Layer", Macromolecules, vol. 25, pp. 4967-4977 (1992).
Semenov, A.N., "Phase Equilibria in Block Copolymer-Homopolymer Mixtures", Macromolecules, vol. 26, pp. 2273-2281 (1993).
Serizawa, Takeshi et al., "Transmission Electron Microscopic Study of Cross-Sectional Morphologies of Core-Corona Polymeric Nanospheres", Macromolecules, 33, pp. 1759-1764 (2000).
Shull, Kenneth R., "End-Adsorbed Polymer Brushes in High- and Low-Molecular-Weight Matrices", Macromolecules, vol. 29, pp. 2659-2666 (1996).
Simmons, Blake et al., "Templating Nanostructure trhough the Self-Assembly of Surfactants", Synthesis, Functionalization and Surface Treatment of Nanoparticles, ASP (Am.Sci.Pub.), pp. 51-52, 174-208 (2003).
Stepanek, Miroslav et al. "Time-Dependent Behavior of Block Polyelectrolyte Micelles in Aqueous Media Studied by Potentiometric Titrations, QELS and Fluoroetry", Langmuir, Vo. 16, No. 6, pp. 2502-2507 (2000).
Thurmond II, K. Bruce et al., "Water-Soluble Knedel-like Structures: The Preparation of Shell-Cross-Linked Small Particles", J. Am. Chem. Soc., vol. 118, pp. 7239-7240 (1996).
Thurmond II, K. Bruce et al., "The Study of Shell Cross-Linked Knedels (SCK), Formation and Application", ACS Polym. Prepr. (Div Polym. Chem.), vol. 38, No. 1, pp. 62-63 (1997).
Thurmond, K. Bruce et al., "Shell cross-linked polymer micelles: stabilized assemblies with great versatility and potential", Colloids and Surfaces B: Biointerfaces, vol. 16, pp. 45-54 (1999).
Tiyapiboonchaiya, C. et la., "Polymer-m-Ionic-Liquid Electrolytes", Micromol. Chem. Phys., 203, pp. 1906-1911 (2002).
Tomalia, Donald A. et al., Dendritic Macromolecules: Synthesis of Starburst Dendrimers, , Macromolecules, vol. 19, No. 9, pp. 2466-2468 (1986).
Tsitsilianis, Constantinos et al., "Synthesis and characterization of hetero-arm star copolymers", Makromol. Chem. 191, pp. 2319-2328 (1990).
Tuzar et al ., "Anomalous Behaviour of Solutions of Styrene-Butadiene Block Copolymers in Some Solvents", Makromol. Chem. 178, pp. 22743-22746 (1977).
Tuzar, Zdenek et al., "Micelles of Block and Graft Copolymers in Solutions", Surface and Colloid Science, vol. 15, Chapter 1, pp. 1-83 (1993).
Utiyama et al., "Light-Scattering Studies of a Polystyrene-Poly(methyl methacrylate) Two-Blcok Copolymer in Mixed Solvents", Macromolecules, vol. 7, No. 4, pp. 515-520 (Jul.-Aug. 1974).
Vamvakaki, M. et al., "Synthesis of novel block and statistical methacrylate-based ionomers containing acidic, basic or betaine residues", Polymer, vol. 39, No. 11, pp. 2331-2337 (1998).
van der Maarel, J.R.C. et al., "Salt-Induced Contraction of Polyelectrolyte Diblock Copolymer Micelles", Langmuir, vol. 16, No. 19, pp. 7510-7519 (2000).
Vermeesch, I. et al., "Chemical Modification of Poly (styrene-co-maleic anhydride) with Primary N-Alkylamines by Reactive Extrusion", J. Applied Polym. Sci., vol. 53, pp. 1365-1373 (1994).
Wang, Xiaorong et al., "Chain conformation in two-dimensional dense state", Journal of Chemical Physics, vol. 121, No. 16, pp. 8158-8162 (Oct. 22, 2004).
Wang, Xiaorong et al., "Strain-induced nonlinearity of filled rubbers", Physical Review E 72, 031406, pp. 1-9 (Sep. 20, 2005).
Pre-print article, Wang, Xiaorong et al., "PMSE 392- Manufacture and Commercial Uses of Polymeric Nanoparticles", Division of Polymeric Materials: Science and Engineering (Mar. 2006).
Wang, Xiaorong et al., "Manufacture and Commercial Uses of Polymeric Nanoparticles", Polymeric Materials: Science and Engineering, vol. 94, p. 659 (2006).
Wang, Xr. et al., "Fluctuations and critical phenomena of a filled elastomer under deformation", Europhysics Letters, vol. 75, No. 4, pp. 590-596 (Aug. 15, 2006).
Wang, Xiaorong et al., "Under microscopes the poly(styrene/butadiene) nanoparticles", Journal of Electron Microscopy, vol. 56, No. 6, pp. 209-216 (2007).
Wang, Xiaorong et al., "Synthesis, Characterization, and Application of Novel Polymeric Nanoparticles", Macromolecules, 40, pp. 499-508 (2007).
Wang, Xiaorong et al., "Heterogeneity of structural relaxation in a particle-suspension system", EPL, 79, 18001, pp. 1-5 (Jul. 2007).
Wang, Xiaorong et al., "Dispersing hairy nanoparticles in polymer melts", Polmer, vol. 49, pp. 5683-5691 (Nov. 1, 2008).
Webber, Stephen E. et al., "Solvents and Self-Organization of Polymers", NATO ASI Series, Series E: Applied Sciences, vol. 327, pp. 1-509 (1996).
Whitmore, Mark Douglas et al., "Theory of Micelle Formation in Block Copolymer-Homopolymer Blends", Macromolecules, vol. 18, pp. 657-665 (1985).
Wijmans, C.M. et al., "Effect of Free Polymer on the Structure of a Polymer Brush and Interaction between Two Polymer Brushes", Macromolecules, vol. 27, pp. 3238-3248 (1994).
Wilkes, J.S. et al., "Dialkylimidazolium Chloroaluminate Melts: A New Class of Room-Temperature Ionic Liquids for Electrochemistry, Spectroscopy, and Synthesis", Inorg. Chem., 21, pp. 1263-1264 (1982).
Wilson, D.J. et al., "Photochemical Stabilization of Block Copolymer Micelles", Eur. Polym. J., vol. 24, No. 7, pp. 617-621 (1988).
Witten, T.A. et al., "Stress Relaxation in the Lamellar Copolymer Mesophase", Macromolecules, vol. 23, pp. 824-829 (1990).
Wooley, Karen L, "From Dendrimers to Knedel-like Structures", Chem. Eur. J., 3, No. 9, pp. 1397-1399 (1997).
Wooley, Karen L, "Shell Crosslinked Polymer Assemblies: Nanoscale Constructs Inspired from Biological Systems", Journal of Polymer Science: Part A: Polymer Chemistry, vol. 38, pp. 1397-1407 (2000).
Worsfold, Denis J. et al., "Preparation et caracterisation de polymeres-modele a structure en etoile, par copolymerisation sequencee anionique", Canadian Journal of Chemistry, vol. 47, pp. 3379-3385 (Mar. 20, 1969).
Worsfold, D.J., "Anionic Copolymerization of Styrene with p-Divinylbenzene", Macromolecules, vol. 3, No. 5, pp. 514-517 (Sep.-Oct. 1970).
Zheng, Lei et al., "Polystyrene Nanoparticles with Anionically Polymerized Polybutadiene Brushes", Macromolecules, 37, pp. 9954-9962 (2004).
Zilliox, Jean-Georges et al., "Preparation de Macromolecules a Structure en Etoile, par Copolymerisation Anionique", J. Polymer Sci.: Part C, No. 22, pp. 145-156 (1968).
"Quaternary Ammonium Compounds", Encyclopedia of Chem Tech., 4th Ed., vol. 20, pp. 739-767 (1996).
Vulcanization Agents and Auxiliary Materials, Kirk-Othmer, Encyclopedia of Chemical Technology, 3rd Ed., Wiley Interscience, NY, 1982, vol. 22, pp. 390-403.
Bridgestone Americas 2006 Presentation (14 pp.).
Lipman, Bernard, Mar. 26, 2002 Notice of Allowance from U.S. Appl. No. 09/970,830 (4 pp.).
Kiliman, Leszek B., Feb. 13, 2003 Office from U.S. Appl. No. 10/038,748 (3 pp.).
Kiliman, Leszak B., Aug. 25, 2003 Notice of Allowance from U.S. Appl. No. 10/038,748 (5 pp.).

(56) References Cited

OTHER PUBLICATIONS

Harlan, Robert D., Mar. 17, 2004 Restriction/Election Office Action from U.S. Appl. No. 10/223,393 (6 pp.).
Harlan, Robert D., Jun. 22, 2004 Office Action from U.S. Appl. No. 10/223,393 (6 pp.).
Harlan, Robert D., Jan. 3, 2005 Notice of Allowance from U.S. Appl. No. 10/223,393 (6 pp.).
Lipman, Bernard, Mar. 25, 2004 Restriction/Election Office Action from U.S. Appl. No. 10/331,841 (6 pp.).
Lipman, Bernard, Nov. 18, 2004 Notice of Allowance from U.S. Appl. No. 10/331,841 (5 pp.).
Lipman, Bernard, Mar. 24, 2004 Restriction/Election Office Action from U.S. Appl. No. 10/345,498 (5 pp.).
Lipman, Bernard, Nov. 23, 2004 Notice of Allowance from U.S. Appl. No. 10/345,498 (5 pp.).
Choi, Ling Siu, Mar. 24, 2006 Office Action from U.S. Appl. No. 10/755,648 (11 pp.).
Choi, Ling Siu, Dec. 4, 2006 Notice of Allowance from U.S. Appl. No. 10/755,648 (9 pp.).
Asinovsky, Olga, Jun. 20, 2006 Office Action from U.S. Appl. No. 10/791,049 (11 pp.).
Asinovsky, Olga, Dec. 22, 2006 Office Action from U.S. Appl. No. 10/791,049 (11 pp.).
Asinovsky, Olga, Jun. 7, 2007 Office Action from U.S. Appl. No. 10/791,049 (11 pp.).
Asinovsky, Olga, Aug. 16, 2007 Advisory Action from U.S. Appl. No. 10/791,049 (2 pp.).
Asinovsky, Olga, Nov. 28, 2007 Office Action from U.S. Appl. No. 10/791,049 (9 pp.).
Asinovsky, Olga, May 21, 2008 Office Action from U.S. Appl. No. 10/791,049 (11 pp.).
Asinovsky, Olga, Jul. 29, 2008 Advisory Action from U.S. Appl. No. 10/791,049 (3 pp.).
Asinovsky, Olga, Sep. 11, 2008 Office Action from U.S. Appl. No. 10/791,049 (12 pp.).
Mullis, Jeffrey C., Mar. 11, 2009 Office Action from U.S. Appl. No. 10/791,049 (9 pp.).
Mullis, Jeffrey C., May 19, 2009 Advisory Action from U.S. Appl. No. 10/791,049 (5 pp.).
Mullis, Jeffrey C., Mar. 30, 2011 Decision on Appeal from U.S. Appl. No. 10/791,049 [7 pp.].
Ronesi, Vickey M., Jan. 8, 2007 Office Action from U.S. Appl. No. 10/791,177 (5 pp.).
Harlan, Robert D., May 3, 2007 Office Action from U.S. Appl. No. 10/791,177 (6 pp.).
Harlan, Robert D., Oct. 18, 2007 Office Action from U.S. Appl. No. 10/791,177 (6 pp.).
Harlan, Robert D., Jan. 9, 2008 Advisory Action from U.S. Appl. No. 10/791,177 (3 pp.).
Harlan, Robert D., Mar. 7, 2008 Advisory Action from U.S. Appl. No. 10/791,177 (3 pp.).
Harlan, Robert D., May 28, 2008 Office Action from U.S. Appl. No. 10/791,177 (8 pp.).
Harlan, Robert D., Dec. 10, 2008 Final Office Action from U.S. Appl. No. 10/791,177 (8 pp.).
Harlan, Robert D., Mar. 11, 2009 Notice of Allowance from U.S. Appl. No. 10/791,177 (8 pp.).
Harlan, Robert D., Dec. 29, 2009 Notice of Allowance from U.S. Appl. No. 10/791,177 (6 pp.).
Le, Hoa T., Dec. 14, 2004 Office Action from U.S. Appl. No. 10/791,491 (5 pp.).
Le, Hoa T., Jul. 5, 2005 Office Action from U.S. Appl. No. 10/791,491 (9 pp.).
Le, Hoa T., Apr. 10, 2006 Notice of Allowance from U.S. Appl. No. 10/791,491 (5 pp.).
Kiliman, Leszek B., Sep. 9, 2005 Office Action from U.S. Appl. No. 10/817,995 (7 pp.).
Kiliman, Leszek B., Mar. 23, 2006 Office Action from U.S. Appl. No. 10/817,995 (7 pp.).
Kiliman, Leszek B., Dec. 13, 2006 Office Action from U.S. Appl. No. 10/817,995 (6 pp.).
Kiliman, Leszak B., May 15, 2007 Advisory Action from U.S. Appl. No. 10/817,995 (2 pp.).
Kiliman, Leszak B., Apr. 2, 2008 Notice of Allowance from U.S. Appl. No. 10/817,995 (5 pp.).
Kiliman, Leszek B., Sep. 5, 2008 Office Action from U.S. Appl. No. 10/817,995 (5 pp.).
Kiliman, Leszek B., Mar. 19, 2009 Office Action from U.S. Appl. No. 10/817,995 (5 pp.).
Kiliman, Leszek B., Nov. 13, 2009 Office Action from U.S. Appl. No. 10/817,995 (6 pp.).
Ducheneaux, Frank D., Jun. 8, 2010 Office Action from U.S. Appl. No. 10/817,995 [19 pp.].
Ducheneaux, Frank D., Dec. 28, 2010 Final Office Action from U.S. Appl. No. 10/817,995 [24 pp.].
Ducheneaux, Frank D., Apr. 4, 2011 Advisory Action from U.S. Appl. No. 10/817,995 [6 pp.].
Wyrozebski Lee, Katarzyna I., Dec. 19, 2006 Office Action from U.S. Appl. No. 10/872,731 (6 pp.).
Wyrozebski Lee, Katarzyna I., Mar. 7, 2007 Office Action from U.S. Appl. No. 10/872,731 (13 pp.).
Wyrozebski Lee, Katarzyna I., Sep. 14, 2007 Office Action from U.S. Appl. No. 10/872,731 (9 pp.).
Chevalier, Alicia Ann, Sep. 6, 2006 Office Action from U.S. Appl. No. 10/886,283 (5 pp.).
Chevalier, Alicia Ann, Jan. 4, 2007 Office Action from U.S. Appl. No. 10/886,283 (8 pp.).
Chevalier, Alicia Ann, Jul. 2, 2007 Office Action from U.S. Appl. No. 10/886,283 (8 pp.).
Chevalier, Alicia Ann, Jan. 4, 2008 Office Action from U.S. Appl. No. 10/886,283 (8 pp.).
Chevalier, Alicia Ann, Nov. 25, 2009 Office Action from U.S. Appl. No. 10/886,283 (7 pp.).
Chevalier, Alicia Ann, May 3, 2010 Final Office Action from U.S. Appl. No. 10/886,283 (8 pp.).
Chevalier, Alicia Ann, Jul. 8, 2010 Advisory Action from U.S. Appl. No. 10/886,283 [3 pp.].
Chevalier, Alicia Ann, Nov. 23, 2010 Office Action from U.S. Appl. No. 10/886,283 [6 pp.].
Rosenberg, Nancy D., Apr. 12, 2011 Notice of Allowance from U.S. Appl. No. 10/886,283 [4 pp.].
Mullis, Jeffrey C., Oct. 31, 2006 Office Action from U.S. Appl. No. 11/050,115 (6 pp.).
Mullis, Jeffrey C., Mar. 24, 2008 Office Action from U.S. Appl. No. 11/050,115 (10 pp.).
Mullis, Jeffrey C., Aug. 21, 2008 Office Action from U.S. Appl. No. 11/050,115 (7 pp.).
Mullis, Jeffrey C., Nov. 5, 2008 Advisory Action from U.S. Appl. No. 11/050,115 (4 pp.).
Mullis, Jeffrey C., Feb. 25, 2009 Office Action from U.S. Appl. No. 11/050,115 (8 pp.).
Mullis, Jeffrey C., Sep. 21, 2009 Notice of Allowance from U.S. Appl. No. 11/050,115 (4 pp.).
Mullis, Jeffrey C., Dec. 18, 2009 Supplemental Notice of Allowability from U.S. Appl. No. 11/050,115 (2 pp.).
Lipman, Bernard., Sep. 29, 2006 Office Action from U.S. Appl. No. 11/058,156 (5 pp.).
Lipman, Bernard, May 21, 2007 Notice of Allowance from U.S. Appl. No. 11/058,156 (3 pp.).
Lipman, Bernard, Aug. 28, 2007 Notice of Allowance from U.S. Appl. No. 11/058,156 (5 pp.).
Lipman, Bernard, Feb. 28, 2008 Notice of Allowance from U.S. Appl. No. 11/058,156 (5 pp.).
Lipman, Bernard, May 29, 2008 Notice of Allowance from U.S. Appl. No. 11/058,156 (5 pp.).
Lipman, Bernard, Jan. 14, 2009 Notice of Allowance from U.S. Appl. No. 11/058,156 (5 pp.).
Lipman, Bernard, Oct. 3, 2006 Notice of Allowance from U.S. Appl. No. 11/064,234 (5 pp.).
Ram, Saira B., Oct. 20, 2005 Office Action from U.S. Appl. No. 11/104,759 (12 pp.).

(56) References Cited

OTHER PUBLICATIONS

Raza, Saira B., Aug. 21, 2006 Final Office Action from U.S. Appl. No. 11/104,759 (14 pp.).
Haider, Saira Bano, Dec. 22, 2006 Advisory Action from U.S. Appl. No. 11/104,759 (3 pp.).
Haider, Saira Bano, May 16, 2007 Office Action from U.S. Appl. No. 11/104,759 (9 pp.).
Haider, Saira Bano, Oct. 30, 2007 Final Office Action from U.S. Appl. No. 11/104,759 (11 pp.).
Haider, Saira Bano, Mar. 19, 2008 Advisory Action from U.S. Appl. No. 11/104,759 (3 pp.).
Haider, Saira Bano, Jun. 12, 2008 Office Action from U.S. Appl. No. 11/104,759 (10 pp.).
Haider, Saira Bano, Dec. 2, 2008 Office Action from U.S. Appl. No. 11/104,759 (10 pp.).
Haider, Saira Bano, Mar. 3, 2009 Advisory Action from U.S. Appl. No. 11/104,759 (3 pp.).
Haider, Saira Bano, Sep. 11, 2009 Examiner's Answer from U.S. Appl. No. 11/104,759 (9 pp.).
Haider, Saira Bano, Feb. 9, 2011 Decision on Appeal from U.S. Appl. No. 11/104,759 [4 pp.].
Harlan, Robert D., Nov. 7, 2005 Office Action from U.S. Appl. No. 11/117,981 (7 pp.).
Harlan, Robert D., Jul. 20, 2006 Office Action from U.S. Appl. No. 11/117,981 (6 pp.).
Harlan, Robert D., Jan. 26, 2007 Office Action from U.S. Appl. No. 11/117,981 (8 pp.).
Harlan, Robert D., Jul. 12, 2007 Office Action from U.S. Appl. No. 11/117,981 (6 pp.).
Harlan, Robert D., Jan. 2, 2008 Office Action from U.S. Appl. No. 11/117,981 (6 pp.).
Harlan, Robert D., Jul. 25, 2008 Office Action from U.S. Appl. No. 11/117,981 (8 pp.).
Harlan, Robert D., Jan. 9, 2009 Office Action from U.S. Appl. No. 11/117,981 (6 pp.).
Harlan, Robert D., Apr. 30, 2009 Office Action from U.S. Appl. No. 11/117,981 (7 pp.).
Harlan, Robert D., Sep. 29, 2009 Final Office Action from U.S. Appl. No. 11/117,981 (6 pp.).
Harlan, Robert D., Dec. 4, 2009 Notice of Allowance from U.S. Appl. No. 11/117,981 (5 pp.).
Lipman, Bernard, Sep. 14, 2006 Office Action from U.S. Appl. No. 11/168,297 (4 pp.).
Lipman, Bernard, Mar. 2, 2007 Notice of Allowance from U.S. Appl. No. 11/168,297 (3 pp.).
Lipman, Bernard, Apr. 18, 2007 Supplemental Notice of Allowability from U.S. Appl. No. 11/168,297 (3 pp.).
Maksymonko, John M., Feb. 20, 2008 Office Action from U.S. Appl. No. 11/305,279 (14 pp.).
Maksymonko, John M., Aug. 6, 2008 Office Action from U.S. Appl. No. 11/305,279 (11 pp.).
Zemel, Irina Sopja, Jan. 22, 2009 Advisory Action from U.S. Appl. No. 11/305,279 (2 pp.).
Zemel, Irina Sopja, May 28, 2009 Office Action from U.S. Appl. No. 11/305,279 (7 pp.).
Zemel, Irina Sopja, Dec. 3, 2009 Final Office Action from U.S. Appl. No. 11/305,279 (10 pp.).
Maksymonko, John M., Jul. 17, 2008 Office Action from U.S. Appl. No. 11/305,281 (13 pp.).
Lipman, Bernard, Jan. 28, 2009 Notice of Allowance from U.S. Appl. No. 11/305,281 (5 pp.).
Le, Hoa T., Sep. 25, 2008 Office Action from U.S. Appl. No. 11/612,554 (8 pp.).
Le, Hoa T., May 14, 2009 Notice of Allowance from U.S. Appl. No. 11/612,554 (4 pp.).
Maksymonko, John M., Jun. 13, 2008 Office Action from U.S. Appl. No. 11/641,514 (7 pp.).
Mullis, Jeffrey C., Oct. 31, 2008 Office Action from U.S. Appl. No. 11/641,514 (10 pp.).
Mullis, Jeffrey C., Apr. 30, 2009 Final Office Action from U.S. Appl. No. 11/641,514 (11 pp.).
Mullis, Jeffrey C., Jul. 15, 2009 Advisory Action from U.S. Appl. No. 11/641,514 (4 pp.).
Mullis, Jeffrey C., Nov. 9, 2009 Office Action from U.S. Appl. No. 11/641,514 (9 pp.).
Mullis, Jeffrey C., May 26, 2010 Final Office Action from U.S. Appl. No. 11/641,514 [8 pp.].
Mullis, Jeffrey C., Aug. 12, 2010 Advisory Action from U.S. Appl. No. 11/641,514 [4 pp.].
Mullis, Jeffrey C., Oct. 8, 2010 Notice of Allowance from U.S. Appl. No. 11/641,514 [2 pp.].
Mullis, Jeffrey C., Nov. 24, 2010 Notice of Allowability from U.S. Appl. No. 11/641,514 (3 pp.).
Maksymonko, John M., Jun. 11, 2008 Office Action from U.S. Appl. No. 11/642,124 (16 pp.).
Cain, Edward J., Dec. 31, 2008 Notice of Allowance from U.S. Appl. No. 11/642,124 (5 pp.).
Cain, Edward J., Mar. 31, 2009 Notice of Allowance from U.S. Appl. No. 11/642,124 (5 pp.).
Maksymonko, John M., May 30, 2008 Office Action from U.S. Appl. No. 11/642,795 (12 pp.).
Cain, Edward J., Dec. 9, 2008 Final Office Action from U.S. Appl. No. 11/642,795 (6 pp.).
Cain, Edward J., Feb. 23, 2009 Notice of Allowance from U.S. Appl. No. 11/642,795 (5 pp.).
Wheeler, Thurman Michael, Oct. 14, 2009 Restriction/Election Office Action from U.S. Appl. No. 11/642,796 (8 pp.).
Wheeler, Thurman Michael, Feb. 8, 2010 Office Action from U.S. Appl. No. 11/642,796 (13 pp.).
Wheeler, Thurman Michael, Jul. 30, 2010 Final Office Action from U.S. Appl. No. 11/642,796 [15 pp.].
Wheeler, Thurman Michael, May 31, 2011 Office Action from U.S. Appl. No. 11/642,796 (12 pp.).
Maksymonko, John M., May 28, 2008 Office Action from U.S. Appl. No. 11/642,802 (10 pp.).
Mulcahy, Peter D., Dec. 11, 2008 Restriction/Election Office Action from U.S. Appl. No. 11/642,802 (7 pp.).
Mulcahy, Peter D., May 13, 2009 Office Action from U.S. Appl. No. 11/642,802 (7 pp.).
Mulcahy, Peter D., Nov. 9, 2009 Final Office Action from U.S. Appl. No. 11/642,802 (6 pp.).
Peets, Monique R., May 11, 2009 Restriction/Election Office Action from U.S. Appl. No. 11/697,801 (6 pp.).
Peets, Monique R., Jul. 20, 2009 Office Action from U.S. Appl. No. 11/697,801 (9 pp.).
Peets, Monique R., Jan. 5, 2010 Final Office Action from U.S. Appl. No. 11/697,801 (9 pp.).
Peets, Monique R., Apr. 15, 2010 Notice of Allowance from U.S. Appl. No. 11/697,801 (5 pp.).
Lipman, Bernard, Mar. 20, 2008 Office Action from U.S. Appl. No. 11/764,607 (4 pp.).
Lipman, Bernard, Sep. 25, 2008 Notice of Allowance from U.S. Appl. No. 11/764,607 (3 pp.).
Lipman, Bernard, Jan. 27, 2009 Notice of Allowance from U.S. Appl. No. 11/764,607 (4 pp.).
Mullis, Jeffrey C., Mar. 3, 2010 Restriction/Election Office Action from U.S. Appl. No. 11/771,659 (7 pp.).
Mullis, Jeffrey C., Jun. 30, 2010 Notice of Allowance from U.S. Appl. No. 11/771,659 [5 pp.].
Sykes, Altrev C., Mar. 20, 2009 Office Action from U.S. Appl. No. 11/818,023 (27 pp.).
Sykes, Altrev C., Oct. 16, 2009 Office Action from U.S. Appl. No. 11/818,023 (20 pp.).
Sykes, Altrev C., Apr. 5, 2010 Final Office Action from U.S. Appl. No. 11/818,023 (24 pp.).
Syes, Altrev C., Oct. 22, 2010 Advisory Action from U.S. Appl. No. 11/818,023 [2 pp.].
Sykes, Altrev C., Oct. 29, 2010 Examiner's Answer from U.S. Appl. No. 11/818,023 [24 pp.].
Pak, Hannah J., Apr. 2, 2009 Office Action from U.S. Appl. No. 11/941,128 (9 pp.).

(56) References Cited

OTHER PUBLICATIONS

Pak, Hannah J., Jan. 6, 2010 Final Office Action from U.S. Appl. No. 11/941,128 (10 pp.).
Pak, Hannah J., Apr. 30, 2010 Notice of Allowance from U.S. Appl. No. 11/941,128 (11 pp.).
Egwim, Kelechi Chidi, Sep. 30, 2010 Office Action from U.S. Appl. No. 12/047,896 [6 pp.].
Egwim, Kelechi Chidi, Mar. 21, 2011 Final Office Action from U.S. Appl. No. 12/047,896 [6 pp.].
Egwim, Kelechi Chidi, Jun. 13, 2011 Advisory Action from U.S. Appl. No. 12/047,896 [2 pp.].
Mullis, Jeffrey C., May 23, 2011 Office Action from U.S. Appl. No. 12/288,174 (6 pp.).
Mullis, Jeffrey C., Jun. 3, 2011 Restriction/Election Office Action from U.S. Appl. No. 12/374,883 (7 pp.).
Mullis, Jeffrey C., Jul. 27, 2011 Office Action from U.S. Appl. No. 12/374,883 (13 pp.).
Harlan, Robert D., Dec. 28, 2009 Office Action from U.S. Appl. No. 12/504,255 (6 pp.).
Harlan, Robert D., May 13, 2010 Final Office Action from U.S. Appl. No. 12/504,255 (7 pp.).
Harlan, Robert D., Jun. 9, 2010 Office Action from U.S. Appl. No. 12/504,255 [6 pp.].
Harlan, Robert D., Dec. I, 2010 Notice of Allowance from U.S. Appl. No. 12/504,255 [6 pp.].
Chen, Jizhuang, Dec. 30, 2005 Office Action from Chinese Patent Application No. 02819527.2 (9 pp.).
Chen, Jizhuang, Dec. 21, 2007 Office Action from Chinese Patent Application No. 02819527.2 (12 pp.).
Chen, Jizhuang, Sep. 26, 2008 Office Action from Chinese Patent Application No. 02819527.2 (4 pp.).
Zhang, Qian, Feb. 10, 2011 Office Action from Chinese Patent Application No. 200780036040.X with English translation (12 pp.).
Xia, Lanying, English translation of Apr. 20, 2011 Office Action from Chinese Patent Application No. 200780047895.2 [4 pp.].
Schutte, M., Aug. 8, 2006 Office Action from European Patent Application No. 02807196.7 (5 pp.).
Schutte, Maya, Sep. 3, 2007 Office Action from European Patent Application No. 02807196.7 (2 pp.).
Russell, Graham, Nov. 4, 2008 Office Action from European Patent Application No. 057423162 (2 pp.).
Mensah, Laure, Dec. 15, 2009 Extended European Search Report from European Patent Application No. 07813483.0 (4 pp.).
Mensah, Laure, Sep. 20, 2010 Office Action from European Patent Application No. 07813483.0 [4 pp.].
Watanabe, Y., May 7, 2008 Office Action from Japanese Patent Application No. 582224/2003 (5 pp.).
Watanabe, Y., Jul. 29, 2008 Office Action from Japanese Patent Application No. 582224/2003 (17 pp.).
Schutte, M., Nov. 13, 2003 International Search Report from PCT Patent Application No. PCT/US02/31817 (3 pp.).
Schutte, M., May 28, 2004 International Search Report from PCT Patent Application No. PCT/US03/40375 (3 pp.).
Iraegui Retolaza, E., Jul. 9, 2004 International Search Report from PCT Patent Application No. PCT/US2004/001000 (3 pp.).
Russell, G., Aug. 1, 2005 International Search Report from PCT Patent Application No. PCT/US2005/010352 (3 pp.).
Johnson, Edward M., Dec. 12, 2008 International Search Report from PCT Application No. PCT/US07/74611 (5 pp.).
Iraegui Retolaza, E., May 30, 2008 International Search Report from PCT Patent Application No. PCT/US2007/026031 (4 pp.).
Cussac, Yolaine, Jun. 24, 2009 International Preliminary Report on Patentability from PCT Patent Application No. PCT/US2007/026031 (7 pp.).
Mettler, Rolf-Martin, May 27, 2008 International Search Report from PCT Patent Application No. PCT/US2007/087869 (4 pp.).
Hammon, Andrew, Aug. 25, 2008 International Search Report from PCT Patent Application No. PCT/US2008/068838 (4 pp.).
Brovkina, T.A., English translation of May 4, 2011 Office Action from Russian Patent Application No. 2009107218 [7 pp.].

Park, Jong Chul, Aug. 3, 2010 International Search Report from PCT/US2009/069680 [3 pp.].
Wang, Xiaoreng et al., U.S. Appl. No. 10/791,049, filed Mar. 2, 2004 entitled "Method of Making Nano-Particles of Selected Size Distribution".
Wang, Xiaoreng et al., U.S. Appl. No. 10/791,177, filed Mar. 2, 2004 entitled "Rubber Composition Containing Functionalized Polymer Nanoparticles".
Wang, Xiaorong et al., U.S. Appl. No. 10/872,731, filed Jun. 21, 2004 entitled "Reversible Polymer/Metal Nano-Composites and Method for Manufacturing Same".
Wang, Xiaorong et al., U.S. Appl. No. 10/886,283, filed Jul. 6, 2004 entitled "Hydropobic Surfaces with Nanoparticles".
Wang, Xiaorong et al., U.S. Appl. No. 11/058,156, filed Feb. 15, 2005 entitled "Multi-Layer Nano-Particle Preparation and Applications".
Wang, Xiaorong et al., U.S. Appl. No. 11/104,759, filed Apr. 13, 2005 entitled "Nano-Particle Preparation and Applications".
Bohm, Georg G.A. et al., U.S. Appl. No. 11/117,981, filed Apr. 29, 2005 entitled "Self Assembly of Molecules to Form Nano-Particle".
Wang, Xiaorong et al., U.S. Appl. No. 11/305,279, filed Dec. 16, 2005 entitled "Combined Use of Liquid Polymer and Polymeric Nanoparticles for Rubber Applications".
Wang, Xiaorong et al., U.S. Appl. No. 11/344,861, filed Feb. 1, 2006 entitled "Nano-Composite and Compositions Therefrom".
Wang, Xiaorong et al., U.S. Appl. No. 11/642,796, filed Dec. 20, 2006 entitled "Hollow Nano-Particles and Method Thereof".
Wang, Xiaorong et al., U.S. Appl. No. 11/764,607, filed Jun. 18, 2007 entitled "Multi-Layer Nano-Particle Preparation and Applications".
Warren, Sandra, U.S. Appl. No. 11/771,659, filed Jun. 29, 2007 entitled "One-Pot Synthesis of Nanoparticles and Liquid Polymer for Rubber Applications".
Wang, Xiaorong et al., U.S. Appl. No. 11/941,128, filed Nov. 16, 2007 entitled "Nano-Particle Preparation and Applications".
Wang, Xiaorong et al., U.S. Appl. No. 11/954,268, filed Dec. 12, 2007 entitled "Nanoporous Polymeric Material and Preparation Method".
Wang, Xiaorong et al., U.S. Appl. No. 12/047,896, filed Mar. 13, 2008 entitled "Reversible Polymer/Metal Nano-Composites and Method for Manufacturing Same".
Wang, Xiaorong et al., U.S. Appl. No. 12/184,895, filed Aug. 1, 2008 entitled "Disk-Like Nanoparticles".
Wang, Xiaorong et al., U.S. Appl. No. 12/374,883 international filed Jul. 27, 2007, entitled "Polymeric Core-Shell Nanoparticles with Interphase Region".
Berger, Sebastian et al., "Stimuli-Responsive Bicomponent Polymer Janus Particles by 'Grafting from'/ 'Grafting to' Approaches," Macromolecules, 41, pp. 9669-9676 (2008).
Dendukuri, Dhananjay et al., "Synthesis and Self-Assembly of Amphiphilic Polymeric Microparticles," Langmuir, 23, pp. 4669-4674 (2007).
The Dow Chemical Company, "DVB Cross-link a variety of materials for improved thermal, physical, and chemical properties," 44 pp. (Jan. 2003).
Min, Ke et al., "Atom Transfer Radical Dispersion Polymerization of Styrene in Ethanol," Macromolecules, vol. 40, pp. 7217-7222 (2007).
Schacher, Felix et al., "Multicompartnnent Core Micelles of Triblock Terpolymers in Organic Media," Macromolecules, 42, pp. 3540-3548 (2009).
Walther, Andreas et al., "Janus Particles," Soft Matter, 4, pp. 663-668 (2008).
Wang, Y. et al., "Janus-Like Polymer Particles Prepared Via Internal Phase Separation from Emulsified Polymer/Oil Droplets," Polymer, vol. 50, No. 14, pp. 3361-3369 (2009).
Zhang, Jian et al., "Bioconjugated Janus Particles Prepared by in Situ Click Chemistry," Chemistry of Materials, 21, pp. 4012-4018 (2009).
Zhao, Bin et al., "Mixed Polymer Brush-Grafted Particles: A New Class of Environmentally Responsive Nanostructured Materials," Macromolecules, 42, pp. 9369-9383 (2009).
Mullis, Jeffrey C., Feb. 9, 2011 Restriction/Election Office Action from U.S. Appl. No. 12/288,174 (8 pp.).
Xia, Lanying, Jul. 6, 2011 Office Action with English translation from Chinese Application No. 200780047895.2 (8 pp.).

(56) References Cited

OTHER PUBLICATIONS

Brovkina, T.A., Oct. 12, 2011 Office Action with English translation from Russian Application No. 2009107218 (8 pp.).
Chinese Patent Office, Nov. 3, 2011 Office Action with English translation from Chinese Application No. 200780036040.X (12 pp.).
Mulcahy, Peter D., Nov. 9, 2011 Office Action from U.S. Appl. No. 11/642,802 (6 pp.).
Mullis, Jeffrey C., Feb. 1, 2012 Office Action from U.S. Appl. No. 12/374,883 (9 pp.).
Zemel, Irina Sopja, Apr. 30, 2012 Decision on Appeal from U.S. Appl. No. 11/305,279 (12 pp.).
Wang, Chun Cheng, May 4, 2012 Office Action from U.S. Appl. No. 12/555,183 (9 pp.).
Hofler, Thomas, May 22, 2012 Supplementary European Search Report with Search Opinion from European Application No. 09837105.7 (5 pp.).
Watanabe, Yoko, May 22, 2012 Office Action with English translation from Japanese Application No. 2008-248866 (5 pp.).
Malashkova, E.S., Jun. 1, 2012 Office Action with English translation from Russian Application No. 2010102943 (10 pp.).
Adams, Donald E. et al., Jun. 18, 2012 Decision on Appeal from U.S. Appl. No. 11/818,023 (13 pp.).
Kaucher, Mark S., Nov. 5, 2012 Office Action from U.S. Appl. No. 12/979,732 (24 pp.).
Wheeler, Thurman Michael, Nov. 6, 2012 Office Action from U.S. Appl. No. 11/642,796 (14 pp.).
Sykes, Altrev C., Nov. 8, 2012 Final Office Action from U.S. Appl. No. 11/818,023 (20 pp.).
Mulcahy, Peter D., Dec. 6, 2012 Final Office Action from U.S. Appl. No. 11/642,802 (7 pp.).
Kaucher, Mark S., Dec. 18, 2012 Office Action from U.S. Appl. No. 13/142,770 (19 pp.).
Nakamura, Eiji, Mar. 26, 2013 Office Action with English translation from Japanese Application No. 2009-522021 (9 pp.).
Giesemann, Gerhard, Apr. 8, 2013 Office Action from European Application No. 08772275.7 (4 pp.).
Peets, Monique R., Apr. 11, 2013 Office Action from U.S. Appl. No. 12/979,719 (6 pp.).
Inoue, M., Jun. 4, 2013 Office Action with English translation from Japanese Application No. 2009-543130 (6 pp.).
Chinese Patent Office, Jun. 28, 2013 Office Action with English translation from Chinese Application No. 200980157756.4 (13 pp.).
Wheeler, Thurman Michael, Jul. 5, 2013 Final Office Action from U.S. Appl. No. 11/642,796 (10 pp.).
Sykes, Altrev C., Sep. 5, 2013 Office Action from U.S. Appl. No. 11/818,023 (22 pp.).
Chinese Patent Office, Sep. 4, 2013 Office Action with English translation from Chinese Application No. 200780036040.X (18 pp.).
Zemel, Irina Sophia, Sep. 30, 2013 Final Office Action from U.S. Appl. No. 11/305,279 (7 pp.).
Uchida, Y., Oct. 1, 2013 Office Action with English translation from Japanese Application No. 2010-515229 (9 pp.).
Schwab, F.C. et al., "Anionic Dispersion Polymerization of Styrene," Advances in Polymer Synthesis, vol. 31, pp. 381-404 (1985).
Peets, Monique R., Nov. 5, 2013 Final Office Action from U.S. Appl. No. 12/979,719 (9 pp.).
Korean Patent Office, Nov. 28, 2013 Office Action from Korean Application No. 10-2009-7004191 (7 pp.).
Chinese Patent Office, Dec. 4, 2013 Office Action from Chinese Application No. 200980157756.4 (8 pp.).
Mulcahy, Peter D., Dec. 10, 2013 Notice of Allowance from U.S. Appl. No. 11/642,802 (2 pp.).
Zemel, Irina Sophia, Jan. 3, 2014 Advisory Action from U.S. Appl. No. 11/305,279 (3 pp.).
Kaucher, Mark S., Jan. 31, 2014 Final Office Action from U.S. Appl. No. 131142,770 (8 pp.).
Nakamura, Eiji, Feb. 12, 2014 Office Action with English translation from Japanese Application No. 2009-522021 (11 pp.).
Sykes, Altrev C., Feb. 14, 2014 Final Office Action from U.S. Appl. No. 11/818,023 (26 pp.).

* cited by examiner

HAIRY POLYMERIC NANOPARTICLES WITH FIRST AND SECOND SHELL BLOCK POLYMER ARMS

CROSS-REFERENCE TO RELATED APPLICATION

This application claims the benefit of priority from U.S. Provisional Application No. 61/166,437, filed on Apr. 3, 2009. This prior application, including the entire written description and drawing figures, is hereby incorporated into the present application by reference.

FIELD OF THE DISCLOSURE

One or more embodiments of the disclosure relate to polymeric Janus nanoparticles and methods for their production.

BACKGROUND AND SUMMARY

Polymeric nanoparticles have attracted increased attention over the past several years in a variety of fields, including catalysis, combinatorial chemistry, protein supports, magnets, and photonics. Similarly, vinyl aromatic (e.g., polystyrene) microparticles have been prepared for various uses, such as, for example, as a reference standard in the calibration of various instruments, medical research, and medical diagnostic testing. Although it is known that the addition of polymeric nanoparticles to rubber compositions can improve various characteristics of a rubber composition, indiscriminate addition of polymeric nanoparticles to a rubber matrix can also cause degradation of the matrix material. Accordingly, advances are needed in the art of improving the characteristics of rubber compositions via the addition of polymeric nanoparticles.

A polymeric nanoparticle includes a core being at least partially crosslinked, a plurality of first shell block polymer arms and a plurality of second shell block polymer arms, each arm being attached to the core. The monomer residues of the first shell block polymer arms are different than monomer residues of the second shell block polymer arms.

A rubber composition includes a rubber matrix; at least one filler, and nanoparticles. The nanoparticles include a core that is at least partially crosslinked, a plurality of first shell block polymer arms, and a plurality of second shell block polymer arms, each arm being attached to the core. The monomer residues of the first shell block polymer arms are different than monomer residues of the second shell block polymer arms.

A process for preparing multi-armed nanoparticles includes the steps of: (a) polymerizing a first shell block monomer into a plurality of first shell block polymer arms; (b) polymerizing a second shell block monomer into a plurality of second shell block polymer arms; and (c) combining the first shell block polymer arms and the second shell block polymer arms with a core monomer and polymerizing the core monomer onto the first shell block polymer arms and the second shell block polymer arms. The monomer residues of the first shell block polymer arms are different than monomer residues of the second shell block polymer arms A polymeric nanoparticle includes a core being at least partially crosslinked, a plurality of first shell block polymer arms, and a plurality of second shell block polymer arms, each arm being attached to the core. The first shell block polymer arms each comprise at least one monomer residue having at least one polar moiety with a dipole moment of at least 0.5 D.

A living anionic polymerization process for preparing Janus nanoparticles, includes the steps of: (a) polymerizing a first shell block monomer into a plurality of first shell block polymer arms; (b) polymerizing at least one core monomer onto said first shell block polymer arms; (c) cross-linking the core monomer residues; (d) polymerizing a second shell block monomer onto said core block polymer to form a plurality of second shell block polymer arms; and (e) allowing at least partial phase separation between said first and second shell block polymer arms, thereby forming said Janus nanoparticles.

A polymeric nanoparticle includes: a core that is at least partially crosslinked, a plurality of first shell block polymer arms, and a plurality of second shell block polymer arms, each arm being attached to the core. The monomer residues of the first shell block polymer arms are different than monomer residues of the second shell block polymer arms. The first shell block polymer arms comprise a styrene moiety substituted with a heteroatomic group.

DETAILED DESCRIPTION

Figure 1:
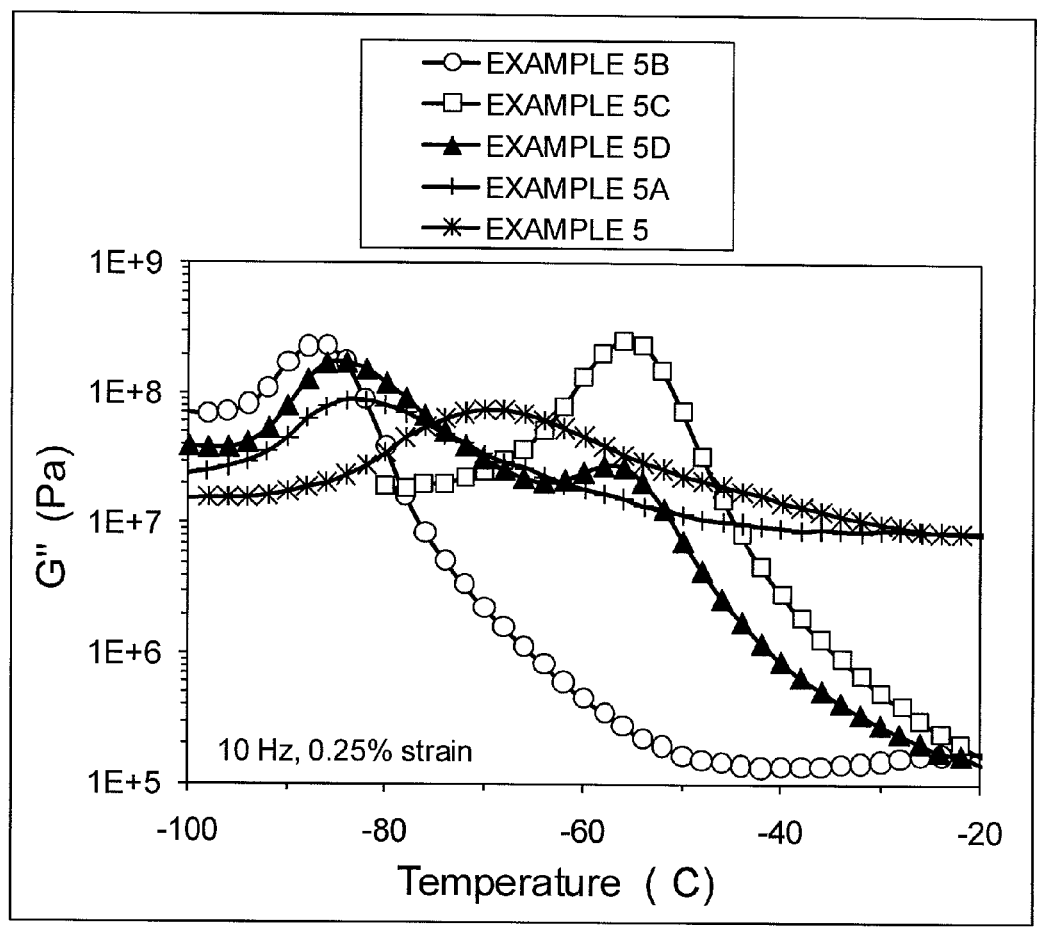
FIG. 1 is G" vs. temperature graph corresponding to Examples 5-5D.

In accordance with one embodiment of the present disclosure, there is provided a Janus nanoparticle comprising a polymeric shell layer having at least two distinct types of at least partially phase-separated polymeric arms at least partially surrounding a polymeric core. In one embodiment, the two polymeric arms do not contain the same type of monomer residue. In one embodiment, at least one type of polymeric arm on the Janus nanoparticle can have a greater polarity than the other type(s) of polymeric arm. As used herein, the term "Janus nanoparticle" shall denote a polymeric nanoparticle comprising at least a first type and second type of polymeric arms, where a first half of the surface layer of the nanoparticle comprises a greater density of the first type of polymeric arm, where a second half of the surface layer of the nanoparticle comprises a greater density of the second type of polymeric arm. (Density in this case meaning the number of arms on each half of the nanoparticle.) Additionally, the term "phase-separated" shall denote the condition where surface layer polymeric arms are spatially segregated by type (e.g., polar and non-polar). The Janus nanoparticles disclosed herein can be employed as a performance-enhancing additive in thermoplastic, thermoplastic elastomer, and/or elastomeric compositions.

As mentioned above, the polymeric shell of the Janus nanoparticles can comprise at least two distinct types of at least partially phase-separated polymeric arms (also referred to as "shell block polymer arms").

The shell block polymer arms of the Janus nanoparticles include monomer-contributed units. For example, the monomers of one or more polymer arms may include conjugated diene monomers, thus providing polymer arms having at least some unsaturation. Examples of conjugated diene monomers useful in the present disclosure include, but are not limited to, 1,3-butadiene; isoprene; alkyl substituted butadienes, such as, for example, 1,2-dimethyl-1,3-butadiene, and 2,3-dimethyl-1,3-butadiene, 1,3-pentadiene, and 1-3-hexadiene. Thus, in one embodiment, the shell block polymer arms of the Janus nanoparticles can comprise one or more poly(conjugated diene) polymers or polymer block segments. In another embodiment, one or more types of shell block polymer arms can comprise polybutadiene polymers or polymer block segments.

In one or more embodiments the shell block polymer arms may be selected from those that are phase separate in a solid state blend (bulk state), but miscible in solution. Furthermore, the solution should be selected so that it facilitates micelle formation of the nanoparticle. For example, polyisoprene and 1,4-polybutadiene meet this requirement in hexane solution. Further examples include styrene-butadiene and butadiene; and 1,4-polybutadiene and 1,2-polybutadiene.

Additionally, in one or more embodiments, the shell block polymer arms of the Janus nanoparticles can separately comprise a plurality of monomer-contributed units derived from alkenyl benzene monomers. Such monomer residues can comprise units derived from alkenyl benzene monomers. Examples of alkenyl benzene monomers suitable for use in the disclosure include, but are not limited to, styrene, α-methylstyrene, 1-vinyl naphthalene, 2-vinyl napththalene, 1-α-methyl vinyl naphthalene, 2-α-methyl vinyl naphthalene, vinyl toluene, methoxystyrene, t-butoxystyrene, and t-butyl styrene, as well as alkyl, cycloalkyl, aryl, alkaryl, and aralkyl derivatives thereof, in which the total number of carbon atoms in the combined hydrocarbon is not greater than 18, as well as any di- or tri-vinyl substituted aromatic hydrocarbons. Additional examples of alkenyl benzene monomers suitable for use in the present disclosure include alkyl substituted styrene monomers represented by the formula shown below:

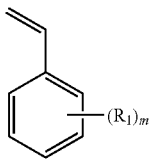

in which m is an integer from 1 to 5 inclusive, or an integer of 1 or 2; and $R_1$ can be selected from saturated or unsaturated, substituted or unsubstituted, straight or branched, cyclic or acyclic $C_1$ to $C_8$ alkyl groups. Specific examples of $R_1$ groups in the above alkyl substituted styrene monomers include, but are not limited to, alkyls such as methyl, ethyl, n-propyl, isopropyl, n-butyl, isobutyl, t-butyl, n-amyl, isoamyl, n-hexyl, n-octyl, and n-decyl; cycloalkyls and alkylcycloalkyl such as cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, isopropylcyclohexyl, and 4-butylcyclohexyl; cycloalkylalkyls such as cyclopentyl-methyl, cyclohexyl-ethyl, cyclopentyl-ethyl, methyl-cyclopentylethyl, and 4-cyclohexylbutyl; alkenyls such as vinyl and propenyl; arylalkyls such as 4-phenylbutyl; aryls and alkylaryls such as phenyl, naphthyl, 4-butylphenyl, and p-tolyl. Accordingly, in one or more embodiments, the polymeric shell can comprise one or more poly(alkenyl benzene) polymers or polymer block segments. Additionally, in one embodiment, the shell block polymer arms of the Janus nanoparticles can comprise one or more poly(conjugated diene) polymers or polymer block segments, one or more poly(alkenyl benzene) polymers or polymer block segments, or one or more poly(alkenyl benzene-conjugated diene) copolymers or copolymer block segments.

When the shell block polymer arms comprise one or more copolymers, the copolymers can be, but are not required to be, random copolymers. In one embodiment, the polymeric shell can comprise a plurality of shell block polymer arms comprising the monomer residues of t-butyl styrene (i.e., poly(t-butyl styrene) polymers or polymer block segments) and/or a plurality of shell block polymer arms comprising the monomer residues of 1,3-butadiene (i.e., polybutadiene polymers or polymer block segments).

As mentioned above, the polymeric shell of the Janus nanoparticles can comprise at least one type of shell block polymer arm on the Janus nanoparticle having a greater polarity than the other type(s) of shell block polymer arm. In one embodiment, the ratio of the number of polar shell block polymer arms to the number of less-polar shell block polymer arms can be in the range of from about 0.1:1 to about 5:1, about 0.5:1 to about 2:1, in the range of from 0.7:1 to about 1.5:1, or in the range of from 0.8:1 to 1.25:1.

The discrepancy in polarity between the differing types of shell block polymer arms can be achieved by having the more polar of the arms contain one or more types of moieties presenting a dipole moment. Thus, in one embodiment, a plurality of at least one type of the shell block polymer arms can each comprise at least one monomer residue having at least one polar moiety with a dipole moment of at least 0.5 Debye ("D"), at least 0.75 D, at least 1.0 D, at least 1.25 D, at least 1.5 D, or at least 2.0 D. The dipole moment of the polar moiety shall be determined as part of the shell block polymer arm, as opposed to such moiety's dipole moment individually. In one embodiment, the less-polar of the shell block polymer arms on the Janus nanoparticle can comprise monomer residues having no polar moieties. If the less-polar of the shell block polymer arms on the Janus nanoparticle comprise polar moieties, such moieties can have dipole moments that are, on average, at least 0.1 D, at least 0.5 D, at least 1.0 D, or at least 2.0 D less than the dipole moments of the polar moieties on the polar shell block polymer arms. In at least one embodiment, a second group of shell block polymer arms is essentially non-polar.

In one embodiment, placement of the polar moieties on the polar shell block polymer arms of the Janus nanoparticles can be achieved by treating a Janus nanoparticle precursor with one or more polarizing agents, as will be discussed in further detail below. In another embodiment, placement of the polar moieties can be achieved by forming the polar shell block polymer arms from certain monomers already containing polar moieties. In some embodiments, the synthesis of the Janus nanoparticles is exclusive of preparation by crosslinking the central (B) block of an ABC triblock copolymer and/or exclusive of free radical polymerization.

As just mentioned, certain monomers can be employed during Janus nanoparticle formation containing polar moieties. Any monomer that when polymerized results in a polymer comprising pendant polar moieties having dipole moments as described above can be employed in the present disclosure. Such monomers will be hereinafter referred to as "polar monomers." In one embodiment, the polar monomers can be unsaturated hydrocarbons comprising one or more heteroatoms, where such heteroatoms remain pendant following polymerization. As used herein, the term "heteroatom" shall denote any atom other than hydrogen or carbon. Examples of heteroatoms suitable for use include, but are not limited to, nitrogen, oxygen, sulfur, fluorine, chlorine, bromine, or iodine. In one or more embodiments, the polar moiety can be in the form of a functional group. For example, amine, hydroxyl, carboxyl, acyl, anhydride, epoxy, or silane groups can be employed as polar moieties. Accordingly, any monomer containing one or more of such functional groups that when polymerized leaves the functional group(s) pendant to the polymer backbone can be employed as the above-mentioned polar monomer. Alternatively, as will be discussed in more detail below, such functional groups can be placed on the Janus nanoparticles by post-treatment with one or more polarizing agents.

In one or more embodiments, polar monomers useful in forming the shell block polymer arms can comprise alkenyl substituted aromatic compounds. Such alkenyl substituted aromatic compounds can comprise one or more heteroatoms in the aromatic ring (i.e., heterocyclic aromatic compounds). In one or more embodiments, the alkenyl substituted aromatic compounds suitable for use as polar monomers include, but are not limited to, vinyl or allyl substituted monocyclic aromatic compounds, such as, for example, furan, thiophene, imidazole, pyrazole, oxazole, isoxazole, thiazole, pyridine, pyrazine, pyrimidine, and pyridazine. In one or more embodiments, the alkenyl substituted aromatic compounds suitable for use as polar monomers include, but are not limited to, vinyl or allyl substituted polycyclic aromatic compounds, such as, for example, benzofuran, isobenzofuran, indole, isoindole, benzothiophene, benzo[c]thiophene, benzimidazole, purine, indazole, benzoxazole, benzisoxazole, benzothiazole, quinoline, quinoxaline, isoquinoline, quinazoline, cinnoline, or acridine. The point of alkenyl (e.g., vinyl or allyl) substitution on any of the aforementioned mono- or polycyclic aromatic compounds is not critical, although such placement may affect the dipole moment of the resulting polar moiety. Accordingly, in one embodiment, the point of alkenyl (e.g., vinyl or allyl) substitution can be chosen so as to maximize the resulting dipole moment of the resulting polar moiety. In one or more embodiments, the polar monomer can comprise 2-vinylpyridine. Accordingly, in one embodiment, at least one type of the shell block polymers can comprise a plurality of poly(2-vinylpyridine) polymers or polymer block segments.

In one or more embodiments, the shell block polymers arms are amphiphilic. The monomer contributed units for the first shell block polymer arm may, for example, be 4-(4-methylpiperaziynyl)styrene or 2-vinylpyridine. The monomer contributed units for the second shell block polymer may be butadiene or another non-polar polymer. In one or more embodiments, the first shell block polymer arms comprising styrene moieties substituted with a heteroatomic group, such as a cyclic heteroatomic group. The heteroatomic atom may, for example, be sulfur, oxygen, or nitrogen. In some embodiments the first shell block polymer arms are styrene moieties substituted with a cyclic amine group. The stability of such species allows the nanoparticle synthesis process to be conducted at higher temperatures than the synthesis of nanoparticles that have functional monomers that are more reactive. For example, the synthesis may be conducted at higher temperatures such as 0° to 50° C., but lower temperatures are also contemplated. In particular, a step of polymerizing the polymer arm that includes the heteroatomic group onto the living end of a core monomer residue may be conducted at a temperature of 0° to 50° C., 15° C. to 40° C., or 20° C. to 30° C.

In one or more embodiments, at least one type of the shell block polymer arms can comprise at least one crystallizable monomer residue. Such monomer residues can be derived from monomers, such as, for example, ethylene, propylene, ethylene oxide, caprolactam (for forming nylon 6), etc.

As mentioned above, the Janus nanoparticles of the present disclosure can comprise a polymeric core. In one embodiment, the nanoparticles of the present disclosure can comprise a polymeric core that is at least 3, at least 5, at least 10, or at least 50 percent surrounded by the above-described shell block polymer arms.

In one or more embodiments, the polymeric core of the Janus nanoparticles can comprise a plurality of monomer residue units derived from conjugated diene monomers, such as those described above with reference to conjugated diene monomers suitable for use in the polymeric shell. In one embodiment, the polymeric core of the nanoparticles comprises residues of 1,3-butadiene monomers. Also, in one or more embodiments, the polymeric core can comprise a plurality of units derived from alkenyl benzene monomers, such as those described above with reference to the alkenyl benzene monomers suitable for use in the polymeric shell. In one embodiment, the polymeric core comprises the residues of styrene monomers. In another embodiment, the polymeric core can comprise the residues of conjugated diene monomers along with the residues of alkenyl benzene monomers. In one embodiment the core comprises divinylbenzene monomer-contributed units. Thus, the polymeric core can comprise one or more copolymers, such as, for example, poly(styrene-butadiene), and poly(styrene-isoprene). When the polymeric core comprises one or more copolymers, the copolymers can be, but are not required to be, random copolymers.

As is discussed in further detail below, the polymeric core and/or the polymeric shell can be at least partially crosslinked. Such crosslinking can be achieved using one or more crosslinking agents. Accordingly, the polymeric core and/or the polymeric shell can additionally comprise residual crosslinking agent moieties or residues. The type of residual crosslinking agent moieties remaining in the polymeric core and/or polymeric shell will depend on the type of crosslinking agent employed, as described below. In one embodiment, the Janus nanoparticles as a whole can comprise residual crosslinking agent moieties in an amount less than 5 weight percent, in the range of from about 0.1 weight percent to about 3 weight percent, or in the range of from 0.5 weight percent to 2 weight percent.

In another embodiment, the Janus nanoparticles of the present disclosure can be hydrogenated. Thus, the Janus nanoparticles can comprise the resulting hydrogenated units derived from any of the above-described monomers. For example, if the shell of a nanoparticle comprises polybutadiene polymer block segments prior to hydrogenation, the shell can comprise polyethylene polymer block segments following hydrogenation.

The Janus nanoparticles of the present disclosure can further include a transition layer positioned between the polymeric core and the polymeric shell. Such a transition layer can comprise one or more polymer segments separating at least a portion of the polymeric core and the polymeric shell. Additionally, the transition layer can comprise one or more residues from monomers such as those described above regarding suitable monomers for inclusion in the polymeric core and/or polymeric shell of the nanoparticles.

In one embodiment, the Janus nanoparticles of the present disclosure can have a mean number average particle size of less than 100, less than 20, or less than 5 nm. The polymeric core of the Janus nanoparticles can have a mean number average diameter in the range of from 5 to about 100 nm, from 5 to 80 nm, from about 10 to about 50 nm, or from 5 to 30 nm. The polymeric shell of the Janus nanoparticles can have a mean number average thickness in the range of from about 1 to about 99 nm, in the range of from about 2 to about 80 nm, or in the range of from 3 to 50 nm. Furthermore, the shell block polymer arms can have a mean number average length of at least 1 nm, in the range of from about 2 to about 100 nm, in the range of from about 4 to about 80 nm, or in the range of from 5 to 50 nm. In other embodiments the mean number average particle size may be 100 nm to 500 nm, such as 100 nm to 250 nm, or 250 nm to 500 nm.

In one embodiment, the polymeric core of the Janus nanoparticles can constitute less than 80 weight percent, less than 50 weight percent, or less than 30 weight percent of the total weight of the Janus nanoparticle. But in some embodiments the core would constitute at least 3%, 5%, or 10% by weight of the nanoparticle. Additionally, the polymeric shell of the Janus nanoparticles can constitute at least 20 weight percent of the nanoparticles, at least 50 weight percent of the nanoparticles, or at least 70 weight percent of the nanoparticles. But in some embodiments the shell would constitute no more than 97%, 95%, or 90% by weight of the nanoparticle.

In one embodiment, the Janus nanoparticles of the present disclosure can have a low polydispersity index ("PDI"). As used herein, the term "polydispersity index" shall denote the weight average molecular weight ("Mw") of the nanoparticles divided by the number average molecular weight ("Mn") of the nanoparticles. In one embodiment, the nanoparticles can have a PDI of less than 2.0, less than 1.5, or less than 1.3 by GPC with polystyrene standards as a reference. In another embodiment, the Janus nanoparticles of the present disclosure can be substantially monodisperse (i.e., a PDI of less than 1.1).

The weight average molecular weight of the shell block polymers may, for example, be greater than 30,000 g/mol, for example ranging from 30,000 to 500,000 g/mol, such as 40,000 g/mol to 250,000 g/mol, or 50,000 g/mol to 150,000 g/mol. The polydispersity of both shell block polymers may, for example, be less than 1.5, such as in a range from 1.01 to 1.5, 1.1 to 1.3, or 1.3 to 1.5. The first shell block polymer may, for example, be present in the nanoparticle from 10-90, 25-75, or 40-60 percent by weight compared to the total weight of the first and second shell block polymers.

In some embodiments the core of the nanoparticles may have a higher Tg than one or both of the shell block polymer arms. For example, the core may have a Tg that is more than 30° C. higher than one or both shell block polymer arms, more than 75° C. higher than one or both shell block polymer arms, more than 150° C. higher than one or both shell block polymer arms, or even more than 200° C. higher than one or both shell block polymer arms. In some embodiments one or both shell block polymer arms have a Tg that is within 50° C. of a Tg of a polymer matrix, within 30° C. of a Tg of a polymer matrix, within 10° C. of a Tg of a polymer matrix, or within 5° C. Tg of the polymer matrix.

In an embodiment, a Tg of the core, the first shell block polymer arms and the second shell block polymer arms have the following relationships: Tg (core) <Tg (second shell block polymer arm) -30° C.; and Tg (core) <Tg (first shell block polymer arm) -30° C.

In a further embodiment, the polymeric core of the Janus nanoparticles can have a different microstructure than the polymeric shell of the nanoparticles. For example, when both the polymeric core and the polymeric shell comprise the residues of conjugated diene monomers, as described above, the polymeric core can have a different vinyl content (i.e., conjugated diene residues in the 1,2- or 3,4-addition configuration) than the polymeric shell. Control of the vinyl content present in the nanoparticles can be achieved via the use of a microstructure controlling agent, as is described in more detail below.

In some embodiments, the Janus nanoparticles have a core that is 5 nm or more, such as, for example, 5 nm to 25 nm, 10 nm to 50 nm, or 50 nm to 100 nm. In addition, the number of arms on the Janus nanoparticles may exceed 10 arms, such as, for example, 11-10,000, 25-150, or 150-5,000.

As mentioned above, the polymeric shell of the Janus nanoparticles can comprise at least two types of shell block polymer arms. These shell block polymer arms can be configured such that the Janus nanoparticles can have a brush-like configuration. As used herein, the term "brush-like configuration" shall denote a structure whereby the shell comprises a plurality of polymeric bristles extending substantially radially from the polymeric core. These "bristles" are not cross-linked and in some embodiments have free ends terminating at the surface of the nanoparticle. In one embodiment, the polymeric shell on each individual nanoparticle can comprise at least 5 polymeric bristles, in the range of from about 10 to about 1,000 polymeric bristles, or in the range of from 50 to 500 polymeric bristles.

In one embodiment of the present disclosure, the polymeric shell and the polymeric core of the nanoparticles can both be hydrophobic. In another embodiment, the polymeric shell and polymeric core of the nanoparticles can have different degrees of hydrophobicity, such that the core and the shell can present varying miscibility in certain organic solvents, as discussed below with respect to solvents used in preparation of the nanoparticles.

In one embodiment, the Janus nanoparticles can be formed by dispersion polymerization (also known as suspension polymerization), although emulsion polymerization may also be contemplated. In one or more embodiments, the Janus nanoparticles of the present disclosure can be prepared via living polymerization, including, but not limited to, living anionic polymerization and living free radical polymerization. Additionally, the Janus nanoparticles can be prepared by reversible addition fragmentation transfer polymerization ("RAFT") or atom transfer radical polymerization ("ATRP"). Furthermore, a multi-stage living anionic polymerization process can be employed.

In one embodiment, the Janus nanoparticles (or precursors, as discussed below) of the disclosure can be formed from two diblock copolymer chains each comprising a core block polymer and a shell block polymer. The core blocks of the diblock copolymer chains can comprise the residues of a plurality of monomer units such as those described above with reference to the polymeric core of the Janus nanoparticles. For ease of reference, such monomers shall hereinafter be referred to as "core block monomers." Additionally, the shell blocks of the diblock copolymer chains can each comprise the residues of a plurality of monomer units such as those described above with reference to the polymeric shell of the nanoparticles. For ease of reference, such monomers shall hereinafter be referred to as "shell block monomers." As described above, the shell block polymers can comprise at least two different types of polymers, and can thus be prepared from at least two different types of shell block monomers. The shell block polymer or shell block polymer arm is a block polymer when it is part of the nanoparticle. That is, it is the shell block, as opposed to the core block. The shell block polymer arm may be a homopolymer or a random or block copolymer when it is considered as a separate polymer not attached to the core block, such as before it is grafted onto the core block.

As described in detail below, the Janus nanoparticles of the present disclosure can be prepared by separately polymerizing at least two different types of shell block monomers in organic solvents, followed by polymerization of the core block monomers in the same organic solvents, thus resulting in two separate block copolymers comprising shell block polymers and core block polymers. The living species of the polymerization can be left at the core end of block copolymers. Next, the two block copolymers can be combined in an organic solvent. The block copolymers can then form micellar structures with the core block polymers located at the centers of the micelles. Thereafter, a crosslinking agent can be added for stabilization of the micelles, followed by isolation of the resulting nanoparticles. The shell block polymers can then undergo phase separation, which can optionally be achieved by treating the nanoparticles with at least one polarizing agent to selectively polarize the desired type(s) of the shell block polymer arms. This process will now be described in more detail.

In one embodiment, the shell block monomers can initially be dispersed in an organic solvent. In one embodiment, the organic solvent employed during polymerization can be a non-polar solvent. In another embodiment, the organic solvent employed can be a hydrocarbon solvent. Examples of organic solvents suitable for use in the disclosure include, but are not limited to, aliphatic hydrocarbons, such as pentane, hexane, heptane, octane, nonane, and decane; as well as alicyclic hydrocarbons, such as cyclohexane, methylcyclopentane, cyclooctane, cyclopentane, cycloheptane, cyclononane, and cyclodecane. Additionally, mixtures of one or more organic solvents can be employed in the present disclosure. In one embodiment, the organic solvent can be present in each of the initial reaction mediums in an amount of at least 100, at least 200, or at least 400 weight percent based on the weight of the shell block monomers.

Following dispersion of the shell block monomers in the organic solvent, polymerizing of the shell block monomers into a shell block polymer segment can be initiated via the addition of one or more anionic initiators. For example, the anionic initiator can be selected from organolithium compounds. Organolithium compounds that are suitable for use in the present disclosure can include those represented by the formula:

where R is a hydrocarbyl group having from 1 to x valence(s). R can be in the range of from about 1 to about 20, or in the range of from 2 to 8, carbon atoms, and can include aliphatic radicals and cycloaliphatic radicals, such as alkyl, cycloalkyl, cycloalkylalkyl, alkylcycloalkyl, alkenyl, as well as aryl and alkylaryl radicals. Furthermore, x can be an integer in the range of from 1 to 4. In one embodiment, x can be 1.

Specific examples of R groups in the above organolithium compound include, but are not limited to, alkyls such as methyl, ethyl, n-propyl, isopropyl, n-butyl, isobutyl, t-butyl, n-amyl, isoamyl, n-hexyl, n-octyl, and n-decyl; cycloalkyls and alkylcycloalkyl such as cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, isopropylcyclohexyl, and 4-butylcyclohexyl; cycloalkylalkyls such as cyclopentyl-methyl, cyclohexyl-ethyl, cyclopentyl-ethyl, methyl-cyclopentylethyl, and 4-cyclohexylbutyl; alkenyls such as vinyl and propenyl; arylalkyls such as 4-phenylbutyl; aryls and alkylaryls such as phenyl, naphthyl, 4-butylphenyl, and p-tolyl.

Other suitable lithium initiators include, but are not limited to, 1,4-dilithiobutane, 1,5-dilithiopetane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, and 4,4'-dilithiobiphenyl. Examples of lithium initiators include n-butyllithium, sec-butyllithium, tert-butyllithium, 1,4-dilithiobutane, and mixtures thereof.

Still other lithium initiators which can be employed include, but are not limited to, lithium dialkyl amines, lithium dialkyl phosphines, lithium alkyl aryl phosphines and lithium diaryl phosphines. Functionalized lithium initiators are also contemplated as useful in the present disclosure, which include such functional groups as amines, formyl, carboxylic acids, alcohol, tin, silicon, silyl ether and mixtures thereof.

In one or more embodiments, n-butyllithium, sec-butyllithium, tert-butyllithium, or mixtures thereof can be used to initiate the polymerization of the shell block monomers.

Following addition of an initiator, polymerization of the shell block monomers can last until the reaction is completed or has reached a desired point, and one or more shell block polymer segments have been obtained. In one embodiment, the polymerization reaction of the shell block monomers can last in the range of from about 0.5 hours to about 24 hours, in the range of from about 0.5 hours to about 10 hours, or in the range of from 0.5 hours to 4 hours. Additionally, polymerization of the shell block monomers can be performed at a temperature in the range of from about −100 to about 200° C., or in the range of from −50 to 150° C. The polymerization method employed in the present disclosure can optionally be conducted in the presence of a modifier, so as to, for example, increase the reaction rate, equalize the reactivity ratio of monomers, or control the microstructure (e.g., vinyl content) of the resulting polymer segments.

Specific examples of modifiers suitable for use in the present disclosure include, but are not limited to, oligomeric oxolanyl propanes, 2,2-bis-(4-methyl dioxane), bis(2-oxolanyl) methane, 1,1-bis(2-oxolanyl)ethane, bistetrahydrofuryl propane, 2,2-bis(2-oxolanyl) propane, 2,2-bis(5-methyl-2-oxolanyl) propane, 2,2-bis-(3,4,5-trimethyl-2-oxolanyl) propane, 2,5-bis(2-oxolanyl-2-propyl) oxolane, octamethylperhydrocyclotetrafurfurylene (cyclic tetramer), and 2,2-bis(2-oxolanyl) butane. Additionally, a mixture of two or more modifiers can also be used during polymerization. In one or more embodiments, oligomeric oxolanyl propanes is employed as a modifier during polymerization.

Other suitable modifiers that can be included during formation of the shell block polymers and/or core block polymers include, but are not limited to, hexamethylphosphoric acid triamide, N,N,N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo[2.2.2]octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphepyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, N-methylmorpholine, and/or tetramethylenediamine. Furthermore, a mixture of two or more of these modifiers can also be used.

The amount of modifier employed during polymerization of the shell block monomers can be in the range of from about 0 to about 400 millimoles modifier per 100 g of monomer, or in the range of from 0.01 to 300 millimoles modifier per 100 g of monomer. In one embodiment, when a microstructure controlling agent is employed, the resulting 1,2-microstructure content of any conjugated diene units in the resulting nanoparticles can be in the range of from about 5 to about 95 percent. In another embodiment, the 1,2-microstructure content of the conjugated diene units in the resulting nanoparticles can be less than 35 percent.

As mentioned above, in one embodiment the shell block monomers can be polymerized first. Following polymerization of the shell block monomers, the core block monomers can be added to the organic solvent. Thereafter, the core block monomers can be copolymerized onto the shell block polymer segments formed during the initial polymerization step.

The polymerization of the core block monomers can be performed under substantially the same conditions as described above with reference to polymerization of the shell block monomers (e.g., in the presence of a lithium-containing initiator, employing one or more modifiers, etc.). Additionally, the polymerization reaction of the core block monomers can last in the range of from about 0.5 hours to about 24 hours, in the range of from about 0.5 hours to about 10 hours, or in the range of from 0.5 hours to 4 hours. Moreover, polymerization of the core block monomers can be performed at a temperature in the range of from about −100 to about 200° C., or in the range of from −50 to 150° C.

The order in which the monomers are polymerized during the above process effectively positions the living end of the block copolymer on the core block polymer segments in order to facilitate later crosslinking, as is described below. However, if it is desired to crosslink the shell block polymer segments, then the order of polymerization during the above described process can be reversed, such that the living end of the polymerization remains on the shell block polymer segments. It should be noted, however, that crosslinking of the nanoparticles is not limited to crosslinking only at the living end of the copolymers. For example functional groups, including double bonds, on the polymer segments may function as crosslinking sites.

As mentioned above, after formation of the at least two block copolymers, they can be combined to form micelle-like structures by aggregating the block copolymers. To achieve micelle formation of the block copolymers, the block copolymers can be dispersed in a selective solvent. As used herein, the term "selective solvent" shall denote a substance that is a solvent for one of the polymer segments on the block copolymer but is a non-solvent for the other polymer segment on the block copolymer. Thus, in one embodiment, the organic solvent employed during the above-described polymerization can be a solvent for the shell block monomers and a precipitant for the core block monomers. Thus, the core block polymer segments will generally tend toward the center of the micelle and the shell block polymer segments typically extend away from the center of the micelle.

After formation, the micelle structures can be at least partially crosslinked. In one embodiment, a multiple-vinyl-substituted aromatic hydrocarbon can be copolymerized with the core block polymer segments of the block copolymers in the micelle-like structures to crosslink the block copolymers. In one embodiment, the multiple-vinyl-substituted aromatic hydrocarbon can have a higher affinity with the core block polymer segments than with the shell block polymer segments. As such, the multiple-vinyl-substituted aromatic hydrocarbon is able to migrate to the center of the micelles, and crosslink the center core of the micelle.

The multiple-vinyl-substituted aromatic hydrocarbon can have the following formula:

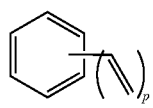

in which p is an integer in the range of from 2 to 6 inclusive. In one embodiment, p can be 2 or 3, or p can be 2 (i.e., divinylbenzene ("DVB")). When DVB is employed as the crosslinking agent, it may be selected from any one of the following isomers or any combination thereof:

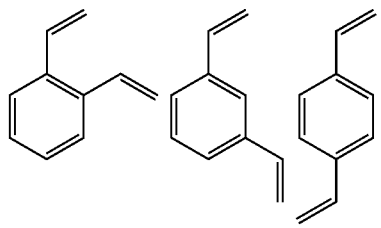

In copolymerizing a multiple-vinyl-substituted aromatic hydrocarbon with the core block polymer segments of the block copolymers in the micelles to crosslink the block copolymers, the copolymerization time for this step can last in the range of from about 0.5 hours to about 24 hours, in the range of from about 0.5 hours to about 10 hours, or in the range of from 0.5 hours to 4 hours.

Following the final formation steps, the polymerization reactions used to prepare the Janus nanoparticles can be terminated with a terminating agent. Suitable terminating agents include, but are not limited to, alcohols such as methanol, ethanol, propanol, and isopropanol; amines; $MeSiCl_3$; $Me_2SiCl_2$; $Me_3SiCl$; $SnCl_4$; $MeSnCl_3$; $Me_2SnCl_2$, and/or $Me_3SnCl$. In one embodiment, the polymerization reaction mixture can be cooled down and dropped into an isopropanol/acetone solution, optionally containing an antioxidant such as butylated hydroxytoluene ("BHT"). The isopropanol/acetone solution can be prepared by mixing 1 part by volume of isopropanol and 4 parts by volume of acetone.

In an alternate embodiment, the Janus nanoparticles (or precursor, as discussed below) can be formed by a process comprising polymerizing a first shell block monomer, then polymerizing at least one core monomer onto the first shell block polymer, leaving the living end at the core end of the resulting copolymer. The resulting block copolymers can then be aggregated and allowed to form micellar structures, which can thereafter be crosslinked as described above. In one embodiment, no terminating agent is added at this point. Thereafter, at least one more shell block polymer can be grafted onto the surface of the living core. This process will now be described in more detail.

In one or more embodiments, the first type of shell block monomers can initially be dispersed in an organic solvent. The organic solvent employed during polymerization can be the same as those mentioned in the preparation methods described above.

Following dispersion of the first shell block monomers in the organic solvent, polymerization of the first shell block monomers into a first shell block polymer segment can be initiated, for example, via the anionic initiators described above. Additionally, polymerization of the first shell block polymer can be performed in the presence of one or more of the above-described modifiers, such as, for example, oligomeric oxolanyl propanes.

Following addition of an initiator and optionally a modifier, polymerizing of the first shell block monomers can last until the reaction is completed or has reached a desired point, and one or more shell block polymer segments have been obtained. In one embodiment, the polymerization reaction of the shell block monomers can last in the range of from about 0.5 hours to about 24 hours, in the range of from about 0.5 hours to about 10 hours, or in the range of from 0.5 hours to 4 hours. Additionally, polymerization of the first shell block monomers can be performed at a temperature in the range of from about −100 to about 200° C., or in the range of from −50 to 150° C.

Following polymerization of the first shell block monomers, the core block monomers can be added to the organic solvent. Thereafter, the core block monomers can be copolymerized onto the first shell block polymer segments formed during the initial polymerization step. The polymerization of the core block monomers can be performed under substantially the same conditions as described above with reference to polymerization of the shell block monomers (e.g., in the presence of a lithium-containing initiator, employing one or more modifiers, etc.). Additionally, the polymerization reaction of the core block monomers can last in the range of from about 0.5 hours to about 24 hours, in the range of from about 0.5 hours to about 10 hours, or in the range of from 0.5 hours to 4 hours. Furthermore, polymerization of the core block monomers can be performed at a temperature in the range of from about −100 to about 200° C., or in the range of from −50 to 150° C.

In one or more embodiments, the core can be copolymerized with at least one cross-linking agent prior to formation of the second block polymer segments. Thus, the core monomers and cross-linking agent, such as those described above, can optionally be added to the polymerization system in the same step. In one embodiment, when polystyrene is the desired core block polymer, styrene and DVB can both be added to the polymerization system during core polymerization. Without being bound by theory it is believed that the addition of a core monomer before the addition of the crosslinking agent will cause the nanoparticle to have a broader transition layer than if the core monomer and crosslinking agent are added simultaneously.

As mentioned above, after formation of the copolymers, they can be aggregated to form micelle-like structures. To achieve micelle formation of the block copolymers, the block copolymers can be dispersed in a selective solvent, such as those described above. Thus, in one or more embodiments, the organic solvent employed during the above-described polymerization can be a solvent for both the first and second shell block monomers and a precipitant for the core block monomers. Thus, the core block polymer segments will generally tend toward the center of the micelle and the shell block polymer segments typically extend away from the center of the micelle.

If the core block polymers are not cross-linked during formation, as mentioned above, the micelle structures can be at least partially crosslinked following micellar formation. As described above, a multiple-vinyl-substituted aromatic hydrocarbon, such as DVB, can be copolymerized with the core block polymer segments of the block copolymers in the micelle-like structures to crosslink the block copolymers. In copolymerizing the micelles to crosslink the block copolymers, the copolymerization time for this step can last in the range of from about 0.5 hours to about 24 hours, in the range of from about 0.5 hours to about 10 hours, or in the range of from 0.5 hours to 4 hours. In at least one embodiment, no terminating agent is added prior to the second shell block monomer polymerization.

Following polymerization of the first shell block monomers and the core block monomers, the second shell block monomers can be added to the organic solvent. Thereafter, the second shell block monomers can be copolymerized onto the living anionic ends of the core block polymer segments formed as described above. The polymerization of the second shell block monomers can be performed under substantially the same conditions as described above with reference to polymerization of the first shell block monomers (e.g., in the presence of a anionic lithium-containing species or lithium-containing initiator), employing one or more modifiers, etc.). Additionally, the polymerization reaction of the second shell block monomers can last in the range of from about 0.5 hours to about 24 hours, in the range of from about 0.5 hours to about 10 hours, or in the range of from 0.5 hours to 4 hours. Furthermore, polymerization of the second shell block monomers can be performed at a temperature in the range of from about −100 to about 200° C., or in the range of from −50 to 150° C.

Following the final formation steps, the polymerization reactions used to prepare the nanoparticles can be terminated with a terminating agent. Suitable terminating agents useful in the present disclosure include those described above, such as, for example, isopropanol. In one embodiment, the polymerization reaction mixture can be cooled down and dropped into an isopropanol/acetone solution, optionally containing an antioxidant such as butylated hydroxytoluene ("BHT"). In one embodiment, the isopropanol/acetone solution can be prepared by mixing 1 part by volume of isopropanol and 4 parts by volume of acetone.

In either of the above-described processes, a polar monomer, such as those described above, can be employed as a starting material for either of the shell block polymers. When a polar monomer is employed as the starting material, the nanoparticles formed following termination can be allowed to undergo phase separation between the shell block polymer arms, thus forming Janus nanoparticles. When the polar monomer is added to a solution the includes a non-polar solvent, it may be helpful in some circumstances to incorporate an additional charge of polar solvent, for example, THF, to improve its solubility.

When a polar monomer is not employed as a starting material in the above-described processes, and the shell block polymer arms do not phase separate based on solubility/compatibility characteristics the resulting product can be a Janus nanoparticle precursor. A Janus nanoparticle precursor comprises polymeric nanoparticles having at least two different types of shell block polymers that are not phase separated. Thus, as mentioned above, the resulting Janus nanoparticle precursor can be post-treated with a polarizing agent to selectively polarize at least one type of the shell block polymer arms while leaving at least one type unpolarized. As used herein, the term "polarizing agent" shall denote any compound capable of placing a pendant group on a selected shell block polymer that results in such pendant group having a dipole moment (i.e., a polar moiety). As mentioned above, such a pendant group can have a dipole moment of at least 0.5 D, at least 0.75 D, at least 1.0 D, at least 1.25 D, at least 1.5 D, or at least 2.0 D. Additionally, as mentioned above, such pendant groups can comprise amine, hydroxyl, carboxyl, acyl, anhydride, epoxy, and/or silane functional groups.

As mentioned above, a first shell block polymer arm can comprise an unsaturated monomer residue, such as results from polymerization of 1,3-butadiene monomers. In one embodiment, the polarizing agent can react with the points of unsaturation to place the polar moiety on the first shell block polymer arm. An example of a polarizing agent suitable for use includes, but is not limited to, diisopropyl azodicarboxylate. In one embodiment, the second shell block polymer arms are substantially exclusive of reactive functionalities, such as reactive double-bonds, so that the addition of the polarizing agent does not react with both the first and second block polymer arms. A polymer block formed of t-butyl styrene monomer residue is an example of a second shell block polymer arm that does not contain reactive functionalities. Following polarization, the nanoparticles' shell block polymers can undergo phase separation between the polar and less-polar shell block polymer arms, thus forming Janus nanoparticles.

In another embodiment, the Janus nanoparticle can be formed of two different shell block arms that need not have a polar moiety or monomer. The phase separation of the two different shell block arms is achieved by selecting polymers for the shell block arms that have sufficient solubility/compatibility differences in solution versus in the solid (bulk) state. For example, the polymers for the shell block arms are miscible in a selected solvent, yet phase separate in a solid state blend.

In one embodiment, living anionic cements of two diene polymers known to be incompatible in the bulk (solid) state are combined in situ and subsequently reacted with a mixture of mono- and difunctional vinyl aromatic monomers. Upon desolventization, each nanoparticle contains a mixture of two distinct types of shell block polymeric arms in the shell which are immiscible in the bulk state. The crosslinked core of the nanoparticle may, for example, be constructed from the polymerization of the vinyl aromatic monomers. In some embodiments the shell block polymer arms are composed of two polydienes (for example, 1,4-polybutadiene and 1,4-polyisoprene). Such nanoparticles may provide compatibilization (reduced domain size) in immiscible blends of low vinyl polybutadiene and polyisoprene (including natural rubber), while simultaneously reinforcing the interface via the nanoparticle hard core.

The Janus nanoparticles having solubility/compatibility differences may be made by either method disclosed above for making the Janus nanoparticles with a polar moiety. The disclosure above regarding examples of solvents, cross-linking agents, and other reagents, also applies to the Janus nanoparticles having solubility/compatibility differences. However, neither a post-treatment step to provide a polar functionality nor a polar-monomer is needed in this embodiment, and the shell block arms should be selected to be phase separate in the bulk state and miscible in solution. In one embodiment, there is a sharp transition from the core to the shell layers, because the nanoparticles are made by adding the core monomer and crosslinking agent simultaneously.

Regardless of which methods and compositions are employed, as mentioned above, the resulting Janus nanoparticles can be at least partially phase-separated. In one embodiment, the resulting Janus nanoparticles can be at least 60, at least 70, at least 80, at least 90, or at least 95 percent phase-separated. For example, 60 percent phase separation means a first side of the nanoparticle has 60% of a first shell block polymer, while the second side has 40% of the first shell block polymer, and the first side of the nanoparticle has 40% of the second shell block polymer, while the second side has 60% of the second shell block polymer. In another embodiment, the resulting Janus nanoparticles can be completely or substantially completely phase-separated, such as 99% phase-separated.

As mentioned above, the Janus nanoparticles of the present disclosure can be employed as performance-enhancing modifiers in thermoplastic, thermoplastic elastomer, and elastomeric compositions. The nanoparticles may be used in rubber composition used in tires, such as in tire treads or tire sidewalls, and in non-tire applications such as air springs.

In fact, a variety of applications are contemplated for use in conjunction with the nanoparticles of the present disclosure. Furthermore, several mechanisms are described herein for modifying the nanoparticles to render them suitable for different applications. The nanoparticles described herein are contemplated for use in each of the disclosed applications.

In one embodiment of the present disclosure, after the Janus nanoparticles have been formed, they may be blended with a rubber to improve the physical characteristics of the rubber composition. Rubber compositions prepared according to this disclosure can comprise Janus nanoparticles in an amount of at least 1 weight percent, in the range of from about 2 to about 80, or in the range of from 5 to 40 weight percent based on the weight of the rubber. Janus nanoparticles can be useful modifying agents for rubbers because they can be discrete particles which are capable of dispersing uniformly throughout a rubber composition, resulting in substantial uniformity of physical characteristics.

One or both shell block polymers of the nanoparticle may, for example, have a number average molecular weight of more than 50% of the number average molecular weight of a rubber polymer matrix, such as, 55% to 100%, 75% to 150%, or 100% to 200%. In some embodiments, when the number average molecular weight of the shell block polymer arm is more than 50% of the number average molecular weight of a rubber polymer matrix, it may result in improved interaction between the polymer matrix and the shell block polymer. In another embodiment, however, the number average molecular weight of the shell block polymer arms may be 50% or less than 50% of the number average molecular weight of a rubber polymer matrix.

In one embodiment, the multi-armed nanoparticle may be used to compatibilize two normally immiscible polymers in a composition. For example, to function as a compatibilizer one shell block polymer arm may be miscible with a first polymer, and the second shell block polymer arm is miscible with a second polymer. Specific examples of such compositions include high 1,4 polyisoprene or natural rubber as a first matrix polymer and high 1,4 polybutadiene as a second matrix polymer, combined with a nanoparticle having a first shell block arm that is a high 1,4 polyisoprene or a 1,2 polybutadiene and a second shell block arm that is a high 1,4 polybutadiene. ("High" means about 80% or more.) In another embodiment, the first matrix polymer is high 1,2 polybutadiene and the second matrix polymer is high 1,4 polybutadiene, combined with a nanoparticle having a first shell block polymer arm that is high 1,2 polybutadiene or 1,4 polyisoprene, and a second shell block polymer arm that is high 1,4 polybutadiene. In another embodiment, the first matrix polymer is high 1,4 polybutadiene and the second matrix polymer is poly(styrene-co-butadiene), combined with a nanoparticle having a first shell block polymer arm that is also high 1,4 polybutadiene, and a second shell block polymer arm that is poly(styrene-co-butadiene) with similar vinyl and styrene contents. (Similar meaning within about 10% based on 100% total possible content.) In another embodiment, the first matrix polymer is high 1,4 polyisoprene or natural rubber and the second matrix polymer is poly(styrene-co-butadiene), combined with a nanoparticle having a first shell block polymer arm that is high 1,4 polyisoprene, and a second shell block polymer arm that is poly(styrene-co-butadiene).

In some embodiments, the nanoparticle functions as a reinforcing compatibilizer because of the core structure, for example, when the core is harder than the polymer matrix, i.e. has a high Tg.

In another embodiment the multi-armed nanoparticle may be used to compatibilize and/or reinforce the polymer matrix and filler. For example, a polar shell block arm will compatibilize the filler, such as silica, and a rubbery shell block arm will compatibilize a similar rubbery elastomer.

The present polymeric nanoparticles are suitable for modifying a variety of rubbers, including, but not limited to, random styrene/butadiene copolymers, butadiene rubber, poly (isoprene), nitrile rubber, polyurethane, butyl rubber, and ethylene propylene diene monomer ("EPDM"). Furthermore, Janus nanoparticles with at least partially hydrogenated shell layers may demonstrate improved compatibility with specific rubbers. For example, nanoparticles including a hydrogenated polyisoprene shell layer may demonstrate superior bonding with and improved dispersion in an EPDM rubber matrix due to the compatibility of hydrogenated poly(isoprene) with EPDM rubber. Additionally, Janus nanoparticles may demonstrate improved compatibility with rubbers. As mentioned above, the shell layer of the Janus nanoparticles may form a brush-like surface. Though not wishing to be bound by theory, it is believed that when such particles are dispersed in a matrix, the host composition is able to diffuse between the arms of the brush-like surface thereby allowing improved interaction between the host and the nanoparticles.

One application for nanoparticle-containing rubber compounds is in tire rubber formulations. Vulcanizable elastomeric compositions according to the present disclosure can be prepared by mixing a rubber and a nanoparticle composition with a reinforcing filler comprising silica, a carbon black, or a mixture of the two. The composition can also comprise a processing aid and/or a coupling agent, a curing agent, and/or an effective amount of sulfur to achieve a satisfactory cure of the composition.

Rubbers suitable for use to make tire rubber formulations according to the present disclosure include, but are not limited to, conjugated diene polymers, copolymers or terpolymers of conjugated diene monomers and monovinyl aromatic monomers. These can be utilized as 100 parts of the rubber in the tread stock compound, or they can be blended with any conventionally employed treadstock rubber, including natural rubber, synthetic rubber, and blends thereof. Such rubbers are well known to those skilled in the art, commercially available, and include, but are not limited to, synthetic polyisoprene rubber, styrene-butadiene rubber ("SBR"), styrene-isoprene rubber, styrene-isoprene-butadiene rubber, butadiene-isoprene rubber, polybutadiene, butyl rubber, neoprene, acrylonitrile-butadiene rubber ("NBR"), silicone rubber, the fluoroelastomers, ethylene acrylic rubber, ethylene-propylene rubber, ethylene-propylene terpolymer, ethylene vinyl acetate copolymer, epichlorohydrin rubber, chlorinated polyethylene-propylene rubbers, chlorosulfonated polyethylene rubber, hydrogenated nitrile rubber, and tetrafluoroethylene-propylene rubber.

Examples of reinforcing silica fillers which can be used in the vulcanizable elastomeric compositions of the present disclosure include wet silica (hydrated silicic acid), dry silica (anhydrous silicic acid), and calcium silicate. Such reinforcing fillers are commercially available. Other suitable fillers include aluminum silicate, and magnesium silicate. In one embodiment, precipitated amorphous wet-process, hydrated silicas can be employed. Silica can be employed in an amount of about 1 to about 100 parts per hundred of the elastomer ("pphe"), in an amount of about 5 to 80 pphe, or in an amount of 30 to 80 pphe. In another embodiment, silica can be employed in an amount of at least 20 pphe, at least 40 pphe, or at least 60 pphe. The useful upper range can be limited by the high viscosity imparted by fillers of this type. Examples of commercially available silica fillers which can be used in the present disclosure include, but are not limited to, HI-SIL 190, HI-SIL 210, HI-SIL 215, HI-SIL 233, and HI-SIL 243, produced by PPG Industries of Pittsburgh, Pa., U.S.A. A number of useful commercial grades of different silicas are also available from DeGussa Corporation (e.g., VN2, VN3), Rhone Poulenc (e.g., ZEOSIL 1165 MP0), and J. M. Huber Corporation.

In one embodiment, the rubber compositions of the present disclosure can be compounded with any form of carbon black, and optionally additionally with silica, as described above. The carbon black can be present in amounts ranging from about 1 to about 100 pphe. The carbon black can include any commonly available, commercially-produced carbon black. In one embodiment, carbon blacks having a surface area of at least 20 m$^2$/g, in the range of from 35 m$^2$/g to 200 m$^2$/g can be used in the present disclosure. Among useful carbon blacks are furnace black, channel blacks, and lamp blacks. A mixture of two or more of the above blacks can be used in preparing the carbon black products of the present disclosure. Examples of suitable carbon blacks useful in the present disclosure include, but are not limited to, N-110, N-220, N-339, N-330, N-352, N-550, N-660, as designated by ASTM D-1765-82a.

In some embodiments, certain additional fillers can also be utilized in the vulcanizable elastomeric compositions of the present disclosure, including mineral fillers, such as clay, talc, aluminum hydrate, aluminum hydroxide and mica. The foregoing additional fillers may, for example, be utilized in an amount in the range of from about 0.5 to about 40 pphe.

Numerous coupling agents and compatibilizing agents are known for use in combining silica and rubber, and can also be employed in the present disclosure. Silica-based coupling and compatibilizing agents suitable for use in the present disclosure include, but are not limited to, silane coupling agents containing polysulfide components, or structures such as, for example, trialkoxyorganosilane polysulfides, containing from about 2 to about 8 sulfur atoms in a polysulfide bridge such as, for example, bis-(3-triethoxysilylpropyl) tetrasulfide ("Si-69"), bis-(3-triethoxysilylpropyl) disulfide ("Si-75"), and alkyl alkoxysilanes, such as octyltriethoxy silane, and hexyltrimethoxy silane.

It will be readily understood by those skilled in the art that the rubber composition can be compounded by methods generally known in the rubber compounding art, such as mixing the various vulcanizable polymer(s) with various commonly used additive materials such as, for example, curing agents, activators, retarders and accelerators, processing additives, such as oils, resins (including tackifying resins), plasticizers, pigments, additional fillers, fatty acids, zinc oxide, waxes, antioxidants, anti-ozonants, and peptizing agents. As known to those skilled in the art, depending on the intended use of the sulfur vulcanizable and sulfur vulcanized material (rubbers), the additives mentioned above are selected and commonly used in conventional amounts.

In one or more embodiments, the Janus nanoparticles of the present disclosure can be employed in a rubber composition comprising a rubber matrix, such as described above, and at least one silica-containing filler to improve certain characteristics of the rubber composition. In one embodiment, such a composition can have a Mooney viscosity of less than 70 MU, less than 60 MU, less than 50 MU, or less than 40 MU. It will be understood to those skilled in the art that the Mooney viscosity of a rubber composition is determined prior to curing. Additionally, such a rubber composition can have a storage modulus ("G'") of at least 60, at least 70, at least 80, or at least 90 MPa at −30° C., 5 Hz, and 2% strain. As is understood in the art, dynamic modulus (including storage modulus) is determined after curing of the rubber composition.

In one embodiment, the above-described Janus nanoparticle-containing rubber compounds can be used to make tire treads and/or side walls of tires due to the enhanced reinforcement capabilities that may be imparted by the Janus nanoparticles.

In one embodiment, tire compositions can comprise tin-functionalized nanoparticles, which are especially suited for use in tire compositions. Nanoparticles including a copolymer shell layer are also suitable for use in such tire compositions, given that the presence of copolymer chains in the shell layer leads to greater diffusion of the host rubber composition into the shell layer of the nanoparticle. Also, the use of a copolymer having minimum length can lead to greater diffusion of the host rubber composition into the shell layer of the nanoparticle.

Another application for such rubber compounds can be in applications requiring superior damping properties, such as engine mounts and hoses (e.g., air conditioning hoses). Rubber compounds having high mechanical strength, super damping properties, and strong resistance to creep are preferred by engine mount manufacturers. In engine mounts, a rubber, because it sits most of its life in a packed and hot position, requires excellent high temperature characteristics. Utilizing the Janus nanoparticles of the present disclosure within select rubber formulations can sufficiently improve the characteristics of the rubber compounds to such a degree as to enable them to be employed in engine mount applications.

The Janus nanoparticles prepared in accordance with the present disclosure may also find application in hard disk technology. Disk drive assemblies for computers traditionally include a magnetic storage disk coaxially mounted about a spindle apparatus that rotates at speeds in excess of several thousand revolutions per minute ("RPM"). The disk drive assemblies also include a magnetic head that reads and writes information to and from the magnetic storage disk while the magnetic disk is rotating. The magnetic head is usually disposed at the end of an actuator arm and is positioned in a space above the magnetic disk. The actuator arm can move relative to the magnetic disk. The disk drive assembly is mounted on a disk base (support) plate and sealed with a cover plate to form a housing that protects the disk drive assembly from environmental contaminants outside of the housing.

Serious damage to the magnetic disks, including loss of valuable information, can result by introducing gaseous and particulate contaminates into the disk drive assembly housing. To substantially prevent or reduce the introduction of gaseous and particulate contaminants into the disk drive housing, a flexible sealing gasket is disposed between the disk drive mounting base (support) plate and the disk drive assembly housing or cover plate. A sealing gasket is usually prepared by punching out a ring-shaped gasket from a sheet of cured elastomer. The elastomeric gasket obtained is usually attached to the base plate of the disk drive assembly mechanically, such as affixing the gasket with screws, or adhesives. In one embodiment, the Janus nanoparticles, when compounded with a polyalkylene and a rubber, demonstrate a tensile strength comparable to that suitable for use in hard disk drive compositions.

Janus nanoparticles prepared in accord with the present disclosure can also be blended with a variety of thermoplastic elastomers, such as poly(styrene-ethylene-propylene-styrene) ("SEPS"), poly(styrene-ethylene-butylene-styrene) ("SEBS"), EEBS, EEPE, polypropylene, polyethylene, and polystyrene. These blends of thermoplastic elastomers and nanoparticles may also be extended via the inclusion of one or more extending agents. For example, suitable extending agents include extender oils and low molecular weight compounds or components. Suitable extender oils include those well known in the art such as, for example, naphthenic, aromatic and paraffinic petroleum oils and silicone oils.

Examples of low molecular weight organic compounds or components useful as extenders in compositions of the present disclosure are low molecular weight organic materials having a number-average molecular weight of less than 20,000, less than 10,000, or less than 5,000. Such compounds or components are commercially available. Although there is no limitation on the material which may be employed, the following is a non-exhaustive list of examples of appropriate materials that can be used as extending agents in the present disclosure:

(1) Softening agents, such as aromatic naphthenic and paraffinic softening agents for rubbers or resins;
(2) Plasticizers, such as plasticizers composed of esters including phthalic, mixed phthalic, aliphatic dibasic acid, glycol, fatty acid, phosphoric and stearic esters, epoxy plasticizers, other plasticizers for plastics, and phthalate, adipate, sebacate, phosphate, polyether and polyester plasticizers for NBR;
(3) Tackifiers, such as coumarone resins, coumaronedene resins, terpene phenol resins, petroleum hydrocarbons and rosin derivative;
(4) Oligomers, such as crown ether, fluorine-containing oligomers, polybutenes, xylene resins, chlorinated rubber, polyethylene wax, petroleum resins, rosin ester rubber, polyalkylene glycol diacrylate, liquid rubber (polybutadiene, styrene/butadiene rubber, butadiene-acrylonitrile rubber, polychloroprene, etc.), silicone oligomers, and poly-α-olefins;
(5) Lubricants, such as hydrocarbon lubricants such as paraffin and wax, fatty acid lubricants such as higher fatty acid and hydroxy-fatty acid, fatty acid amide lubricants such as fatty acid amide and alkylene-bisfatty acid amide, ester lubricants such as fatty acid-lower alcohol ester, fatty acid-polyhydric alcohol ester and fatty acid-polyglycol ester, alcoholic lubricants such as fatty alcohol, polyhydric alcohol, polyglycol and polyglycerol, metallic soaps, and mixed lubricants; and,
(6) Petroleum hydrocarbons, such as synthetic terpene resins, aromatic hydrocarbon resins, aliphatic hydrocarbon resins, aliphatic or alicyclic petroleum resins, polymers of unsaturated hydrocarbons, and hydrogenated hydrocarbon resins.

Other appropriate low-molecular weight organic materials suitable for use as an extender include latexes, emulsions, liquid crystals, bituminous compositions, and phosphazenes. Additionally, two or more of the above-described materials may be used in combination as extending agents in the present disclosure.

When an extending agent is employed in the above-described compositions, the extending agent can be present in an amount of at least 0.5 pphe, in the range of from about 1 to about 80 pphe, in the range of from about 3 to about 50 pphe, or in the range of from 5 to 30 pphe.

In another embodiment of the present disclosure, Janus nanoparticles can be added into typical plastic materials, including polyethylene, polypropylene, polystyrene, polycarbonate, nylon, and polyimides. Inclusion of Janus nanoparticles in such materials can enhance impact strength, tensile strength, and damping properties. Methods generally known in the art for including an additive in plastics may be employed in the present disclosure.

It should be noted that the Janus nanoparticles of the present disclosure are not limited to the exemplary embodiments just described. The present Janus nanoparticles can also be suited to other existing applications for nanoparticles, including, but not limited to, the medical field (e.g., drug delivery and blood applications), information technology (e.g., quantum computers and dots), aeronautical and space research, and energy (e.g., oil refining and lubricants).

Certain aspects of the disclosure can be further illustrated by the following examples of embodiments thereof, although it will be understood that these examples are included merely for purposes of illustration and are not intended to limit the scope of the disclosure unless otherwise specifically indicated.

EXAMPLES

Reagents Employed

In the following examples, butadiene in hexane (about 22 weight percent butadiene), styrene in hexane (about 33 weight percent styrene), pure hexane, and n-butyllithium in hexane (1.6M in hexane) were used as supplied under nitrogen from the Firestone Polymer Company. In Examples 6-8, 2,2-bis(2'-tetrahydrofuryl)propane (1.60 M in hexane, stored over calcium hydride), and BHT solution in hexane were used. The divinylbenzene employed was technical grade and purchased from Aldrich (product number 41, 456-5; Sigma-Aldrich, St. Louis, Mo.) and was stated to be 80 percent as a mixture of isomers. Prior to use in the following examples, divinylbenzene was passed through an inhibitor removal column (Sigma-Aldrich; product number 31, 134-0) packed with an activated alumina in order to remove at least a portion of any polymerization inhibitors. Similarly, neat oligomeric oxolanyl propanes was passed through the same type of inhibitor removal column prior to use in the following examples.

Example 1

Janus Nanoparticle Preparation: Separately-Prepared Arms with Post-Treatment Polarization A first reactor (7.6 L, purchased from Chemineer, Inc.) was used to synthesize the polybutadiene ("PBd"). The reactor was first charged with 11b hexane, followed by 2.4 lbs of a butadiene/hexane blend (22 weight percent butadiene). Polymerization was initiated at 57° C. by adding 5.3 ml of 1.54 M n-butyllithium in hexane, and then was allowed to continue for two hours. A gel permeation chromatography ("GPC") analysis of this solution indicated that the polybutadiene synthesized had a number average molecular weight ("Mn") of 42,200 and a polydispersity ("Mw/Mn") of 1.09.

A second reactor (7.6 L, purchased from Chemineer, Inc.) was used to make poly(t-butyl styrene) ("PtBuSt"). The second reactor was first charged with 0.51 lbs of t-butyl styrene, followed by 3 lbs of hexane. Polymerization was initiated at 57° C. by adding 3 ml of 1.6 M oligomeric oxolanyl propanes in hexane and 4 ml of 1.54 M n-butyllithium in hexane. The polymerization was then allowed to continue for approximately two hours. The GPC analysis indicated that the PtBuSt in the solution had an Mn of 48,880 and an Mw/Mn of 1.12. Then, the PtBuSt/hexane solution was charged into the polybutadiene solution prepared in the first reactor as described above. After thoroughly mixing, 450 ml of the mixed solution, which was still chemically alive, was placed into a clean, dry, nitrogen purged closed bottle. Polymerization was then extended by charging 24 ml of a styrene/hexane blend (containing 33 weight percent styrene) to form a polystyrene ("PS") block on the PBd and PtBuSt blocks. After approximately half an hour, the resulting diblock copolymers (i.e., PBd-PS and PtBuSt-PS) formed spherical micelles in the hexane solution (about 14 weight percent solid aggregated) with the styrene blocks directed toward the center of the micelle structures and the butadiene and t-butylstyrene blocks as tails extending therefrom. After forming the micelles, 1 ml of divinyl benzene ("DVB") was added to the bottle in order to polymerize and crosslink the polystyrene core.

To convert the polybutadiene block of nanoparticles into more polar structures, a 2,000 ml three-neck round-bottom flask was used. 40 g of diisopropyl azocarboxylate (Aldrich) and 1,000 g of a toluene/nanoparticle solution containing 4 weight percent nanoparticles prepared according to the method described above were all added to the flask. The flask was then placed into a silicon oil bath, heated to 110° C. and held at that temperature for eight hours until the red solution became yellow. The solution was then gently washed with water/methanol several times and dried in vacuum. A light-yellow product was obtained. A $^{13}C$ NMR comparison of the carbonyl and aromatic groups on the resulting polarized nanoparticle indicated that the product contained about 50 parts of chemical bonded diisopropyl azodicarboxylate based on 100 parts (by weight) of the original nanoparticle.

The resulting product was soluble in almost all organic solvents (ranging from polar to non-polar solvents), including methanol, ethanol, isopropanol, THF, chloroform, toluene, hexane and cyclohexane. This characteristic is presumably due to existence of the two different kinds of brushes on the shell layer of the nanoparticles (i.e., the PtBuSt and the azo-dicarboxylated PBd) with the PtBuSt soluble in non-polar solvent and the azo-dicarboxylated PBd soluble in polar solvents.

Example 2

Janus Nanoparticle Preparation with Polar Monomer

In this example, nanoparticles bearing poly(2-vinylpridine) ("P2VP") arms and poly(butadiene) ("PBd") arms were synthesized. The PBd arms were synthesized first, and the living ends of the PBd arms were then used to initiate the polymerization of a small amount of divinylbenzene and styrene, yielding PBd arm nanoparticles bearing a number of active sites within their cores. Subsequently, P2VP arms were grown from the active cores of the PBd arms. The following details the procedure.

To a clean, dry 28 oz. beverage bottle was added 100 g of purified hexane, 100 g of 22 weight percent butadiene in hexane solution. Next, 0.3 ml of 1.6 molar oligomeric oxolanyl propanes and 0.3 ml of 1.6 molar n-butyl lithium in hexane solution were added to the bottle. The solution was then stirred for 1 hour before 5 ml of DVB and styrene in hexane solution (styrene 29 weight percent, DVB 12.5 weight percent in hexane) was added to the bottle. Thereafter, the solution was stirred for 1 hour before 100 ml of tetrahydrofuran ("THF") was added, keeping the bottle at −78° C. Next, 12 ml of 2-vinylpyridine was added. Finally, the solution was stirred for one hour before adding 3 ml of isopropanol. The properties of the resulting nanoparticles are listed in Table 1, below:

TABLE 1

Janus Nanoparticle Properties

|  | PBd Arm | P2VP Arm | Entire Nanoparticle |
|---|---|---|---|
| Mn (calculated*) (kg/mol) | 45,800 | 24,400 | — |

TABLE 1-continued

Janus Nanoparticle Properties

|  | PBd Arm | P2VP Arm | Entire Nanoparticle |
|---|---|---|---|
| Mn (measured**) (kg/mol) | 64,000 | — | 298,000 |
| Mn/Mw | 1.023 | — | 1.111 |

*Calculated based on total wt of monomer and molar number of initiator
**Measured via GPC with polystyrene as universal standard Example 3

Preparation of Janus Nanoparticle-Containing Rubber Compositions

Three rubber compositions were prepared according to the formulation shown in Table 2, below, by selectively using the Janus nanoparticle material prepared in Example 2 to replace part of the styrene-butadiene rubber ("SBR") polymer in the compound formulation ("Rubber Sample 1"). Two control samples were prepared for comparison ("Rubber Sample 2" and "Rubber Sample 3").

TABLE 2

Composition of Rubber Samples 1-3

| Component* | Rubber Sample 1 | Rubber Sample 2 | Rubber Sample 3 |
|---|---|---|---|
| styrene-Butadiene Rubber[1] | 90 | 100 | 90 |
| Example 2 (Janus Nanoparticle) | 15 | — | — |
| Silica Filler (SiO)[2] | 70 | 70 | 85 |
| Aromatic Oil | 30 | 30 | 30 |
| Wax | 1.50 | 1.50 | 1.50 |
| Stearic acid | 2.00 | 2.00 | 2.00 |
| Santoflex 13 (antioxidants) | 0.95 | 0.95 | 0.95 |
| Si-69 (silane coupling agent) | 8.00 | 8.00 | 8.00 |
| Sulfur | 1.70 | 1.70 | 1.70 |
| N-(cyclohexylthio)phthalimide (retarder) | 0.25 | 0.25 | 0.25 |
| Zinc oxide | 2.50 | 2.50 | 2.50 |
| Cyclohexyl-benzothiazole sulfenamide (accelerator) | 1.50 | 1.50 | 1.50 |
| Diphenylguanidine (accelerator) | 0.50 | 0.50 | 0.50 |

*Component concentrations given in parts by weight
[1]Duradene 706 from Firestone Polymers (styrene 23.8%, vinyl 13%, cis 35%, trans 52%, and $M_n$ 261 kg/mol, $M_w/M_n$ 2.30).
[2]Hi-Sil 190G.

10 phr of the SBR was considered to be equivalent to the weight of the polymer arm portion of the nanoparticles, and thus only 90 phr of SBR were used in Rubber Sample 1.

Rubber Samples 1-3 were individually prepared by initially charging the styrene-butadiene rubber and the Janus nanoparticle composition (Rubber Sample 1) to a 300 g Brabender mixer, set at an agitation speed of 60 rpm and an initial temperature of 110° C. After approximately 0.5 minutes, the oil and the silica filler were charged to the mixer, followed by a 5 minute drop. This mixture was then remilled at an initial temperature of 110° C. while charging the wax, stearic acid, antioxidants, and coupling agent to the mixer, followed by a 5 minute drop. In a final stage, the resulting mixture was charged to a mixer having an initial temperature of 75° C., and, after approximately 0.5 minutes, the sulfur, zinc oxide, retarder, and accelerators described in Table 2 were charged to the mixer, followed by a 75 second drop. The resulting stock was sheeted and molded at 165° C. for 20 minutes.

Example 4

Analysis of Janus Nanoparticle-Containing Rubber Composition

Each of Rubber Samples 1-3 was tested for Mooney viscosity, tear strength, tensile strength, shore A hardness, hysteresis stability, and wet traction. The Mooney viscosity of each sample was determined at 130° C. The shore A hardness of Rubber Samples 1-3 was determined at 23 and 100° C. for each sample for a period of 3 seconds.

The tear strength of each sample was determined at 170° C. using ASTM-D 624. The test specimen geometry for tear strength determinations was taken in the form of a nicked ring (ASTM-D 624-C). The specimen was tested at a specific gauge length of 1.750 inches.

Tensile strength was determined using ASTM-D 412. The tensile strength of Rubber Samples 6-9 was tested at 23° C. for each sample. The test specimen geometry used for tensile strength determinations was a ring having a width of 0.05 inches and a thickness of 0.075 inches. The specimen was tested at a specific gauge length of 1.0 inch.

Hysteresis stability analyses were performed for each sample, and were measured at temperatures of –30° C. and 60° C. The hysteresis stability determinations were measured using an oscillatory shear dynamic analyzer (ARTS). The test specimen geometry used was a strip having a length of 30 mm and a width of 15 mm. Hysteresis stability analyses were performed at 2% strain and a frequency of 5 Hz.

Measurement of the wet traction (Stanley London) was performed on the British Portable Skid Tester (see Road Research Laboratory Technical Paper No. 66, by C. G. Giles, et al., London (1966)). The sample geometry for the wet traction test was a rectangular bar of 2.54×7.62×0.64 cm.

The results from the above analyses are reported in Table 3, below.

TABLE 3

Characteristics and Performance Results of Rubber Samples 1-3

|  |  | Rubber Sample 1 | Rubber Sample 2 | Rubber Sample 3 |
|---|---|---|---|---|
| Mooney Viscosity | ML1 + 4 (MU) | 38.8 | 50.1 | 85.9 |
|  | t5 (min.) | 39.47 | 56.40 | 50.97 |
| Ring Tear | Strength (N/mm) | 16.059 | 14.471 | 12.032 |
|  | Travel (%) | 288.704 | 246.178 | 122.569 |
| R-Tensile (23° C.) | M300 (MPa) | 9.37 | 6.61 | 8.82 |
|  | M50 (MPa) | 1.71 | 1.14 | 1.53 |
|  | Tb (MPa) | 17.80 | 17.74 | 16.11 |
|  | Eb (%) | 487.41 | 598.47 | 473.77 |
| Hardness (Shore A) | 23° C. | 57.8 | 52.6 | 59.7 |
|  | 100° C. | 63.0 | 55.5 | 64.4 |
| Hysteresis Stability (–30° C.) | G' (MPa) | 94.39 | 38.19 | 79.36 |
|  | G" (MPa) | 26.10 | 13.64 | 22.89 |
|  | Tan δ | 0.28 | 0.35 | 0.29 |
| Hysteresis Stability (60° C.) | G' (MPa) | 14.30 | 6.77 | 12.07 |
|  | G" (MPa) | 1.86 | 0.90 | 1.64 |
|  | Tan δ | 0.13 | 0.13 | 0.14 |
| Wet Traction | Stanley London | 72 | 69 | 71 |

As can be seen in Table 3, the test compound exhibited well balanced physical properties. The most noticeable properties are that the test compound shows higher storage modulus (G'), high tear strength, and better wet traction as compared to the two comparative samples. Additionally, the test compound exhibited significantly lower Mooney viscosity prior to curing, even in the presence of a silica filler, thus providing a more workable composition.

Example 5

Non-Polar Janus Nanoparticle Preparation

A 2-gallon volume reactor was charged with 0.57 kg of dry hexane and 0.52 kg of a 22.0 weight percent solution of 1,3-butadiene in hexane and heated to 60° C. When the desired temperature was reached, 1.4 mL of 1.6M n-BuLi in hexane was added to initiate the polymerization. The solution was stirred for 2.5 hours to facilitate complete conversion of the butadiene monomer. At this point, the un-terminated polymer cement was removed from the reactor and transferred to dry, sealed bottles for further usage. A sample of the 1,4-polybutadiene obtained from the reactor had the following physical characteristics: $M_n$=40 kg/mol; $M_w$=42 kg/mol; $M_w/M_2$=1.08; 1,2-vinyl content=9%; $T_g$=−95° C.

The 2-gallon reactor discussed above was then charged with 0.34 kg of dry hexanes and 0.78 kg of a 15 weight percent solution of isoprene in hexane. The contents were heated to 60° C., and 1.4 mL of 1.6M n-BuLi in hexane was added to initiate the polymerization. The solution was stirred for 2.5 hours in order to reach full conversion of monomer to polymer. A sample of the 1,4-polyisoprene obtained from the reactor had the following physical characteristics: $M_n$=47 kg/mol; $M_w$=57 kg/mol; $M_w/M_n$=1.22; 3,4-content=6%; $T_g$=−57° C.

The un-terminated 1,4-polybutadiene/hexane cement was then reintroduced into the 2-gallon reactor and added to the un-terminated 1,4-polyisoprene solution. The temperature of the mixture was lowered to 22° C., and an additional 8.0 mL of 1.6M n-BuLi in hexane solution was added. The mixture was stirred at ambient temperature for 15 minutes, followed by addition of 0.28 kg of a 33.0 weight percent solution of styrene in hexane, 19 g of 80% technical grade divinylbenzene, and 2.35 kg of dry hexane. The solution temperature was increased to 50° C., and the reaction was stirred at constant temperature for 16 hours. The resulting reaction solution was viscous and reddish-orange in color. After this period, the reaction temperature was lowered to room temperature, and the product particles were precipitated into isopropanol containing Irganox 1520L antioxidant. The product was isolated by filtration through a cheesecloth, followed by drying in a vacuum oven at 50° C. overnight. GPC analysis of the product indicated the following: $M_n$=1.0 Mg/mol; $M_w$=1.2 Mg/mol; $M_w/M_n$=1.23.

Control Examples 5A-5D

For comparative analysis purposes, nanoparticles having only a butadiene shell (Example 5A) were formed according to the same procedure as in Example 5, with the exception that the polyisoprene arms were not added.

In addition, a sample of 1,4-polybutadiene was made (Example 5B) and a sample of 1,4-polyisoprene was made (Example 5C). Examples 5B and 5C were synthesized by a standard linear anionic polymerization and had a molecular weight that was essentially the same as the polybutadiene and polyisoprene shell block polymer arms of the Example 5 (essentially the same meaning within the tolerance allowed by the equipment and procedures).

Finally, to make Example 5D, a 50/50 blend of polyisoprene and polybutadiene was made by combining a portion of the polymers made in Examples 5B and 5C.

Example 6

Analysis of Nanoparticles Formed in Example 5 and 5A

Figure 2:
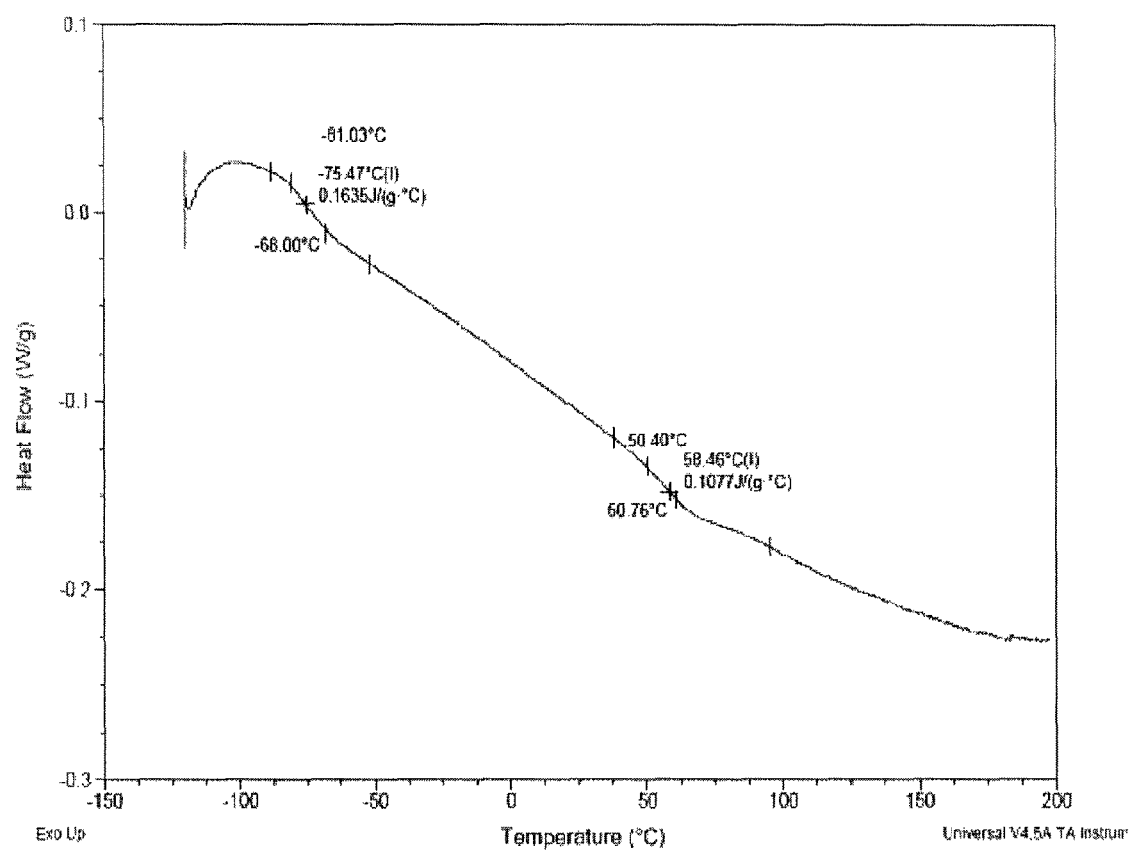
FIG. 2 is a heat flow vs. temperature graph corresponding to Example 5.

The dynamic mechanical analysis data show only one segmental relaxation ($T_g$) peak in G" at −75° C. that correlates to a new intermediate glass transition temperature that does not equate to the $T_g$ of either 1,4-IR (−55° C.) or 1,4-BR (−95° C.). Neither equal blends of 1,4-BR and 1,4-IR linear polymers nor a nanoparticle comprised of one type of polymer in the shell were able to demonstrate a glass transition peak in G" at −75° C. See FIG. 1. This data was further supported by the DSC analysis, as a glass transition temperature at −75.5° C. was observed and no additional glass transitions were observed in the regions common for IR or BR. See FIG. 2

Figure 3:
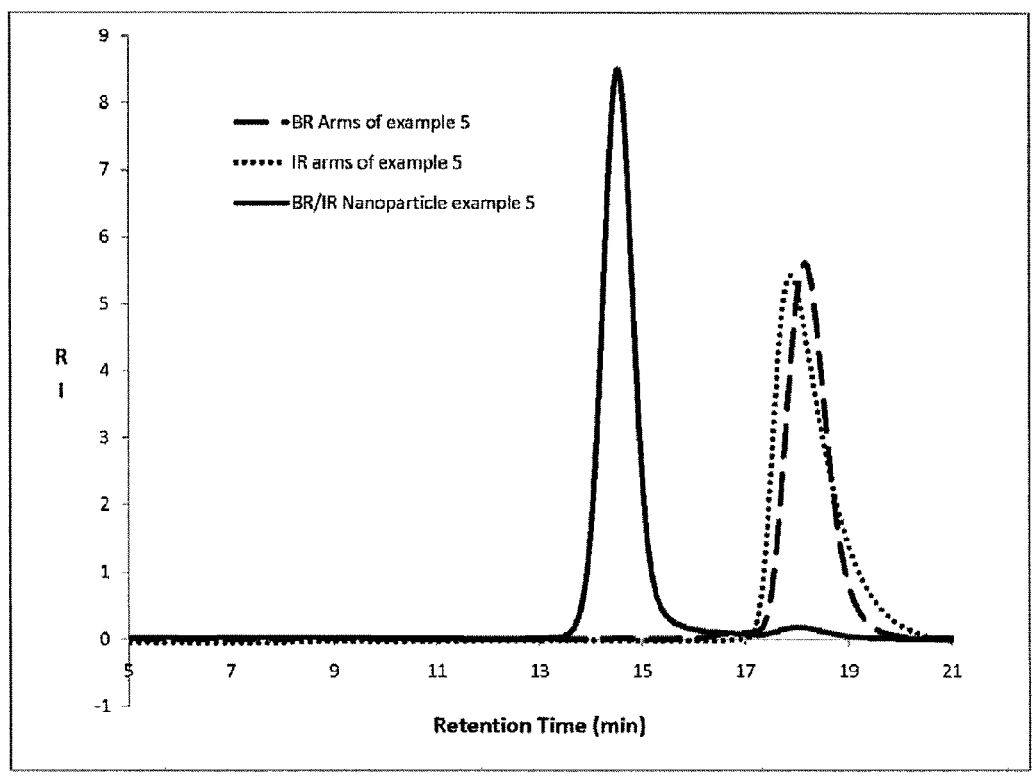
FIG. 3 is a GPC chart comparing the shell block polymer arms to the entire nanoparticle of Example 5.

Example 5 was also analyzed by gel permeation chromography and field flow fractionation to determine the molecular weight of the sample. FIG. 3 shows a GPC analysis indicating that a high molecular weight species was formed that was not a homopolymer, and verified that virtually no unreacted linear polymer remained in the sample. FFF analysis indicated that a particle of approximately 40 Mg/mol molecular weight was formed, which would correspond to a nanoparticle having almost 500 arms.

TABLE 4

| Example | Shell | $M_n$ (Mg/mol) | $M_w/M_n$ | No. of Arms (est.) |
|---|---|---|---|---|
| 4 | BR/IR | 41 | 1.47 | 477 |
| 4A (Control) | BR | 17 | 1.42 | 195 |

Figure 4:
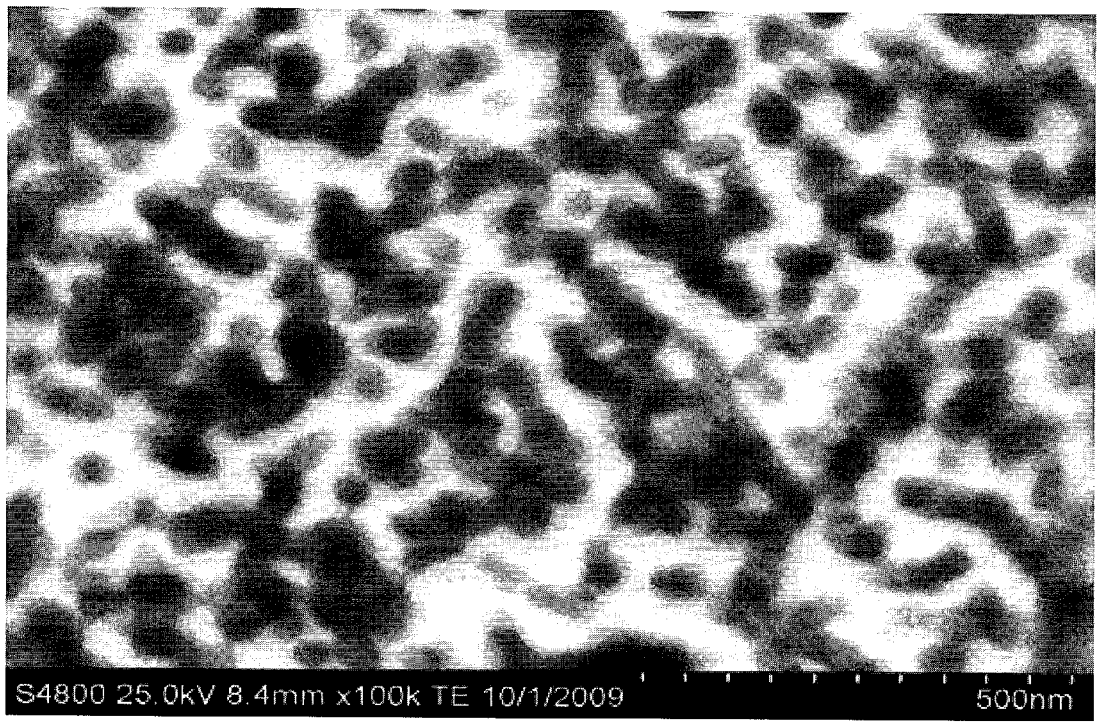
FIG. 4 is a TEM photo of the nanoparticles of Example 5.

TEM analysis (see FIG. 4) indicated that the polyisoprene/polybutadiene shell particles had of a diameter of approximately 50 nm (by a number average determination), which was similar in size to the polybutadiene shell nanoparticles.

Example 7

Synthesis of 4-(4-methylpiperazinyl)styrene [MPS]

Dropwise, 39 ml of n-BuLi (1.7 M, 66 mmol) was added to a stirred, cold (0° C.) solution of methyltriphenylphosphonium bromide (23.2 g, 65 mmol) in 100 ml of THF (dried) under $N_2$. After 15 min, a solution of 4-(4-methylpiperazinyl) benzaldehyde (11.9 g, 58 mmol) in 30 ml of THF was added dropwise via needle. The yellow suspension was stirred for 4 hours and treated with $NH_4Cl$. The solution was filtered and concentrated under vacuum. The residue was purified by silica gel column chromatography elution with hexane, EtOAc, and $Et_3N$ in a 70:20:10 ratio to yield 10.6 g (90%) of white solid product. Without being bound by theory, it is believed that the following reaction took place.

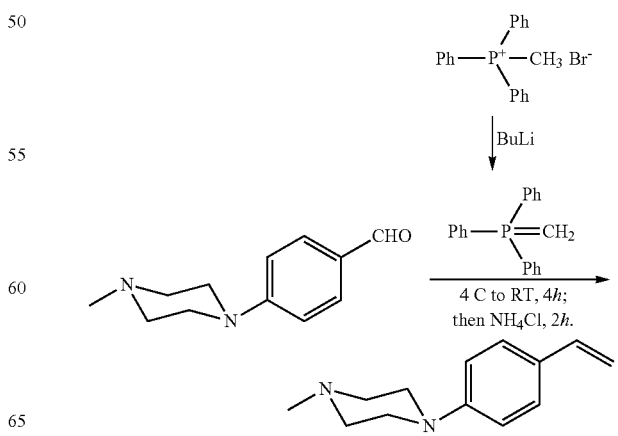

¹H-NMR analysis of the product showed the following characteristics: ¹H-NMR (CDCl₃): δ 2.41 (s, 3H), 2.66 (t, J=4.8 Hz, 4H), 3.28 (t, J=4.8 Hz, 4H), 5.09 (d, J=10.8 Hz, 1H), 5.59 (d, J=16.5 Hz, 1H), 6.63 (dd, J=11.0, 17.5 Hz, 1H), 6.87 (d, J=8.1 Hz, 2H), 7.32 (d, J=8.1 Hz, 2H).

¹³C-NMR (CDCl₃) of the product showed the following characteristics: δ 46.12 (1C), 48.70 (2C), 54.97 (2C), 110.74 (1C), 115.60 (2C), 127.05 (2C), 128.96 (1C), 136.35 (1C), 150.79 (1C).

Example 8

Synthesis of Nanoparticles with Poly(2-vinylpyridine) (P2VP) Shell 100 g hexane, 100 g of 22 wt % 1,3-butadiene and 0.3 ml of 1.6 M 2,2'-di(tetrahydrofuryl)propane were added to a 0.8 liter nitrogen-purged glass bottle. 0.3 ml of 1.7 M n-butyl lithium was then charged to the reactor. After approximately 85 minutes at room temperature, a small amount of sample was taken for polymer analysis, then 5 ml of 30 wt % DVB/styrene (in a 30:70 ratio by weight) blend in hexane was added to the charge and stirred for about 105 min. After taking a sample and adding 100 ml THF, the mixture was cooled down to −78° C. with dry ice IPA bath. 5 ml of 2-vinylpyridine was further added to the charge. The mixture was kept overnight at −78° C. and terminated with BHT/IPA (isopropyl alcohol) at room temperature. The particles were coagulated with IPA and dried under the vacuum.

Example 9

Synthesis of Nanoparticles with Poly[4-(4-methylpiperaziynyl)styrene] (PMPS) Shell 100 g hexane, 100 g of 22 wt % 1,3-butadiene and 0.3 ml of 1.6 M 2,2'-di(tetrahydrofuryl)propane were added to a 0.8 liter nitrogen-purged glass bottle. Then the reactor was charged 0.3 ml of 1.7 M n-butyl lithium. After approximately 85 minutes at room temperature, a small amount of sample was taken for polymer analysis, then 5 ml of 30 wt % DVB/styrene (in a 30:70 ratio by weight) blend in hexane was added to the charge and stirred for about 105 min. After taking a sample and adding 100 ml THF, the mixture was cooled down to −78° C. with dry ice IPA bath. 5 g of 4-(4-methylpiperaziynyl)styrene from Example 7 in THF solution was further added to the charge. The mixture was kept overnight at −78° C. and 2 days at room temperature. After terminating with BHT/IPA, the particles were coagulated with IPA and dried under the vacuum.

Example 10

Rubber Compounding

The amphiphilic nanoparticles characterized in Table 1 were used to replace 12 parts of polymers, 5.6% in total Si compounds as the formulation shown in Table 2. Table 3 summarizes the compound properties.

TABLE 5

Nanoparticle Characterization

| Sample ID | Gel (%) | 1st Shell Arm | | | 2nd Shell Arm | | | DVB/St (w/w) | core % | MNP (GPC) | | MNP (FFF) | |
|---|---|---|---|---|---|---|---|---|---|---|---|---|---|
| | | wt % | polymer | $M_n$ (GPC) (kg/mol) | wt % | polymer | $M_n$ (cal) (kg/mol) | | | $M_n$ (kg/mol) | MWD | $M_n$ (kg/mol) | MWD |
| Example 8 | 0.5 | 77.2 | BR | 57 | 17.5 | P2VP | 10 | 30/70 | 5.3 | 273 | 1.27 | 1763 | 1.10 |
| Example 9 | 10.4 | 77.2 | BR | 51 | 17.5 | PMPS | 10 | 30/70 | 5.3 | 266 | 1.37 | 1137 | 1.07 |

TABLE 6

Rubber Composition Formulation Incorporating Examples 7-9

| | Composition | phr | Mixing Conditions |
|---|---|---|---|
| Master Batch | SBR[1] | 100 | Mixer: 300 g Brabender |
| | Precipitated silica filler[2] | 70 | Agitation Speed: 60 rpm |
| | Aromatic Oil | 30 | Initial Temperature |
| | Wax | 1.5 | 110° C. |
| | Stearic Acid | 2.0 | 0 min charging |
| | Santoflex 13 (antioxidants) | 0.95 | polymers |
| | Si 69 (Silane Coupling Agent) | 8 | 0.5 min charging oil and Carbon Black |
| | | | 5.0 min drop |
| Remill Stage | | | Initial Temperature 110° C. |
| | | | 0 min charging stocks |
| | | | 5.0 min drop |
| Final Batch | Sulfur | 1.7 | Initial Temperature 75° C. |
| | N-(cyclohexylthio) phthalimide (retarder) | 0.25 | 0 sec charging master stock |
| | Zinc Oxide | 2.5 | 30 sec charging curing |
| | Cyclohexyl-benzothiazole sulfenamide (accelerator) | 1.50 | agent and accelerators 75 sec drop |
| | Diphenylguanidine (accelerator) | 0.5 | |

[1]Duradene 706 from Firestone Polymers (styrene 23.8%, vinyl 13%, cis 35%, trans 52%, and $M_w$ 261 kg/mol, $M_w/M_n$ 2.30).
[2]Hi-Sil 190G.

TABLE 7

Characterization of the Functionalized Nanoparticles and Si Compound Properties

| | Example | 8 | 9 | Control |
|---|---|---|---|---|
| | 2nd brush | P2VP | PMPS | |
| | Nanoparticles | 12 | 12 | 0 |
| | SBR[1] | 90 | 90 | 100 |
| | Silica[2] | 70 | 70 | 70 |
| MOONEY (130° C., FINAL) | ML 1 + 4 (MU): | 45.5 | 48.5 | 50.8 |
| | t5 (min): | 49.75 | 55.68 | 59.27 |
| HARDNESS | Shore A Mean: (100 C.) | 60.26 | 60.74 | 57.38 |
| | Shore A Mean: (23 C.) | 64.86 | 64.48 | 62.72 |
| RING TEAR (170 C.) | Strength (N/mm) | 19.65 | 19.97 | 19.68 |
| | Travel (%) | 302 | 330 | 362 |
| RING TENSILE (100 C.) | M50 (MPa) | 1.02 | 0.94 | 0.83 |
| | M300 (MPa) | 6.65 | 6.18 | 5.41 |
| | Tb (MPa) | 7.318 | 8.166 | 7.532 |
| | Eb (%) | 324 | 373 | 386 |
| RING TENSILE (23 C.) | M50 (MPa) | 1.29 | 1.13 | 1.01 |
| | M300 (MPa) | 7.86 | 6.99 | 6.19 |
| | Tb (MPa) | 15.88 | 17.59 | 16.40 |
| | Eb (%) | 492 | 578 | 582 |
| 50 C. tan δ | G' (MPa) | 9.299 | 8.508 | 5.917 |
| | G'' (MPa) | 1.221 | 1.174 | 0.892 |
| | tanδ | 0.131 | 0.138 | 0.151 |

[1]Duradene 706 from Firestone Polymers (styrene 23.8%, vinyl 13%, cis 35%, trans 52%, and $M_w$ 261 kg/mol, $M_w/M_n$ 2.30).
[2]Hi-Sil 190G.

10 phr of the SBR was considered to be equivalent to the weight of the polymer arm portion of the nanoparticles, and thus only 90 phr of SBR were used in the Compositions that included the nanoparticles.

The tear strength of each sample was determined at 170° C. using ASTM-D 624. The test specimen geometry for tear strength determinations was taken in the form of a nicked ring (ASTM-D 624-C). The specimen was tested at a specific gauge length of 1.750 inches.

Tensile strength was determined using ASTM-D 412. The tensile strength of was tested at 23° C. for each sample. The test specimen geometry used for tensile strength determinations was a ring having a width of 0.05 inches and a thickness of 0.075 inches. The specimen was tested at a specific gauge length of 1.0 inch.

The dynamic viscoelastic mechanical properties were obtained from temperature sweep experiments conducted with a frequency of 31.4 rad/sec using 0.5% strain for temperature ranging from −100° C. to −20° C., and 2% strain for the temperature ranging from −20° C. to 100° C.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise" provided above.

As used herein, the terms "having," "has," and "have" have the same open-ended meaning as "comprising," "comprises," and "comprise" provided above.

As used herein, the terms, "including," "include," and "included" have the same open-ended meaning as "comprising," "comprises," and "comprise" provided above.

The present description uses numerical ranges to quantify certain parameters relating to the disclosure. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds). The numerical ranges disclosed herein are a shorthand term for listing every value touching and between the stated ranges.

The embodiments contained in the disclosure above are to be used as illustration only, and should not be used in a limiting sense to interpret the scope of the present disclosure.

It is claimed:

1. A polymeric nanoparticle comprising:
    a core being at least partially crosslinked and comprising one or more monomer residues derived from vinyl-substituted alkenyl benzene monomers;
    a plurality of first shell block polymer arms and a plurality of second shell block polymer arms, each arm being attached to the core;
    wherein monomer residues of the first shell block polymer arms are different than monomer residues of the second shell block polymer arms;
    wherein the plurality of first shell block polymer arms and the plurality of second shell block polymer arms are at least partially phase separated;
    wherein the first shell block polymer arm includes a heterocyclic aromatic compounds;
    wherein the nanoparticle is synthesized by solution polymerization.

2. The polymeric nanoparticle of claim 1, wherein the core is at least 3% by weight of the nanoparticle.

3. The polymeric nanoparticle of claim 1, wherein the plurality of first shell block polymer arms and the plurality of second shell block polymer arms are at least 60% phase separated.

4. The polymeric nanoparticle of claim 1, wherein the first and second shell block polymers arms are selected from polymers that are miscible in a solvent and phase separate in a solid state blend.

5. The polymeric nanoparticle of claim 1, wherein said first shell block polymer arms comprise one or more monomer residues derived from a conjugated diene; and said second shell block polymer arms comprise one or more monomer residues derived from an alkenyl substituted aromatic compound.

6. The polymeric nanoparticle of claim 1, wherein the core has a diameter of 5 to 100 nm.

7. The polymeric nanoparticle of claim 1, wherein the first shell block polymer arms further include a functional group selected from the group consisting of one or more of: an amine functional group, a carboxyl functional group, a hydroxyl functional group, an acyl functional group, an anhydride functional group, an epoxy functional group, and a silane functional group.

8. The polymeric nanoparticle of claim 4, wherein the second shell block polymer arms are substantially exclusive of reactive functionalities.

9. The polymeric nanoparticle of claim 1, wherein said nanoparticle has a ratio of said first shell block polymer arms to said second shell block polymer arms in the range of from about 0.5:1 to about 2:1.

10. The polymeric nanoparticle of claim 1, wherein said first shell block polymer arms each comprise at least one crystallizable monomer residue.

11. The polymeric nanoparticle of claim 1, wherein a Tg of the core, the first shell block polymer arms and the second shell block polymer arms have the following relationships:

Tg (core)<Tg (second shell block polymer arm) -30° C.; and

Tg (core)<Tg (first shell block polymer arm) -30° C.

12. A rubber composition comprising:
a rubber matrix;
at least one filler; and
nanoparticles comprising:
    a core being at least partially crosslinked and comprising one or more monomer residues derived from vinyl-substituted alkenyl benzene monomers;
    a plurality of first shell block polymer arms and a plurality of second shell block polymer arms, each arm being attached to the core;
    wherein monomer residues of the first shell block polymer arms are different than monomer residues of the second shell block polymer arms;
    wherein the plurality of first shell block polymer arms and the plurality of second shell block polymer arms are at least partially phase separated;
    wherein the first shell block polymer arm includes a heterocyclic aromatic compounds;
    wherein the nanoparticle is synthesized by solution polymerization;
    wherein the rubber matrix comprises a first polymer and a second polymer, wherein the first and second polymers are immiscible, wherein the first shell block polymer arm is miscible in the first polymer and the second shell block polymer is miscible in the second polymer.

13. The rubber composition of claim 12, wherein the plurality of first shell block polymer arms and the plurality of second shell block polymer arms are at least 60% phase separated.

14. The rubber composition of claim 12, wherein a Tg of the core, at least one of the first shell block polymer arms and the second shell block polymer arms, and a Tg of the rubber matrix have the following relationships:

Tg (core)<Tg (first or second shell block polymer arms) -30° C.;

Tg (first or second shell block polymer arms) is within 50° C. of Tg (rubber matrix).

15. The rubber composition of claim 12, wherein said rubber composition has a Mooney viscosity (ML$_{1+4}$) of less than 70 MU and a storage modulus (G') of at least 60 MPa at -30° C., 5 Hz, and 2% strain.

16. The rubber composition of claim 12, wherein said first shell block polymer arms comprise one or more monomer residues derived from a conjugated diene, and the second shell block polymer arms comprise one or more monomer residues derived from an alkenyl substituted aromatic compound.

17. The rubber composition of claim 12, wherein the first shell block polymer arms further include a functional group selected from the group consisting of: one or more of an amine functional group, a carboxyl functional group, a hydroxyl functional group, an acyl functional group, an anhydride functional group, an epoxy functional group, and a silane functional group.

18. The rubber composition of claim 12, wherein the rubber matrix comprises a polymer, and an Mn of the first or second shell block polymer is more than 50% of an Mn of the rubber matrix.

19. The rubber composition of claim 13, wherein said rubber composition constitutes at least a portion of a tire.

20. A polymeric nanoparticle comprising:
a core being at least partially crosslinked and comprising one or more monomer residues derived from vinyl-substituted alkenyl benzene monomers;
a plurality of first shell block polymer arms and a plurality of second shell block polymer arms, each arm being attached to the core;
wherein said first shell block polymer arms each comprise at least one monomer residue having at least one polar moiety with a dipole moment of at least 0.5 D;
wherein the first shell block polymer arm includes a heterocyclic aromatic compounds;
wherein the nanoparticle is synthesized by solution polymerization.

21. The process of claim 20, wherein said first shell block polymer arm further comprises an amine functional group, a carboxyl functional group, a hydroxyl functional group, an acyl functional group, an anhydride functional group, an epoxy functional group, and a silane functional group.

22. The rubber composition of claim 12, wherein the rubber matrix comprises a first polymer and a second polymer, and the first and second polymer and the first and second shell block polymer arms are selected from the following combinations:
    the first matrix polymer is a high 1,4 polyisoprene or natural rubber and the second matrix polymer is a high 1,4 polybutadiene, the first shell block polymer arm is a high 1,4 polyisoprene or a 1,2 polybutadiene, and the second shell block polymer arm is a high 1,4 polybutadiene;
    the first matrix polymer is high 1,2 polybutadiene and the second matrix polymer is a high 1,4 polybutadiene, the first shell block polymer arm is a high 1,2 polybutadiene or a 1,4 polyisoprene, and the second shell block polymer arm is a high 1,4 polybutadiene;
    the first matrix polymer is high 1,4 polybutadiene and the second matrix polymer is poly(styrene-co-butadiene), the first shell block polymer arm is a high 1,4 polybutadiene, and the second shell block polymer is a poly(styrene-co-butadiene);
    the first matrix polymer is high 1,4 polyisoprene or natural rubber, the second matrix polymer is poly(styrene-co-butadiene), the first shell block polymer arm is high 1,4 polyisoprene, and the second shell block polymer is poly(styrene-co-butadiene).

23. The polymeric nanoparticle of claim 1, wherein the nanoparticle is not prepared by emulsion polymerization.

24. The rubber composition of claim 12, wherein the filler is selected from the group consisting of silica, carbon black, and combinations thereof.

* * * * *

UNITED STATES PATENT AND TRADEMARK OFFICE
CERTIFICATE OF CORRECTION

PATENT NO. : 9,062,144 B2  
APPLICATION NO. : 12/754367  
DATED : June 23, 2015  
INVENTOR(S) : Wang et al.

Page 1 of 1

It is certified that error appears in the above-identified patent and that said Letters Patent is hereby corrected as shown below:

In The Claims  
Claim #1, line 37, delete "compounds" and insert --compound--.  
Claim #20, line 25, delete "compounds" and insert --compound--.

Signed and Sealed this  
First Day of March, 2016

Michelle K. Lee  
*Director of the United States Patent and Trademark Office*